US010664975B2

(12) United States Patent
Aonuma et al.

(10) Patent No.: US 10,664,975 B2
(45) Date of Patent: May 26, 2020

(54) IMAGE PROCESSING APPARATUS, CONTROL METHOD FOR IMAGE PROCESSING APPARATUS, AND COMPUTER PROGRAM FOR GENERATING A VIRTUAL IMAGE CORRESPONDING TO A MOVING TARGET

(71) Applicant: SEIKO EPSON CORPORATION, Tokyo (JP)

(72) Inventors: Masashi Aonuma, Shiojiri (JP); Kaoru Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 16 days.

(21) Appl. No.: 15/524,156

(22) PCT Filed: Nov. 12, 2015

(86) PCT No.: PCT/JP2015/005641
§ 371 (c)(1),
(2) Date: May 3, 2017

(87) PCT Pub. No.: WO2016/079960
PCT Pub. Date: May 26, 2016

(65) Prior Publication Data
US 2017/0323449 A1    Nov. 9, 2017

(30) Foreign Application Priority Data

Nov. 18, 2014  (JP) ................................ 2014-233263
May 18, 2015  (JP) ................................ 2015-100694

(51) Int. Cl.
*G06T 7/20*   (2017.01)
*G06T 19/00*  (2011.01)
(Continued)

(52) U.S. Cl.
CPC ............... *G06T 7/20* (2013.01); *G06F 3/011* (2013.01); *G06F 3/16* (2013.01); *G06T 19/006* (2013.01); *G06T 2200/04* (2013.01)

(58) Field of Classification Search
CPC ..... G06T 7/20; G06T 19/006; G06T 2200/04; G06F 3/011; G06F 3/16
See application file for complete search history.

(56) References Cited

U.S. PATENT DOCUMENTS 9,734,579 B1 *   8/2017  Weill ...................... G06T 15/10
2005/0049500 A1 *  3/2005  Babu ........................ A61B 8/13
                                                      600/443
(Continued)

FOREIGN PATENT DOCUMENTS

JP   2002-230086 A   8/2002
JP   2013-520729 A   6/2013
WO   2013/187131 A1  12/2013

OTHER PUBLICATIONS

May 2, 2016 Search Report issued in International Patent Application No. PCT/JP2015/005641.
(Continued)

*Primary Examiner* — Ming Y Hon
(74) *Attorney, Agent, or Firm* — Oliff PLC

(57) ABSTRACT

An image processing apparatus includes an external scenery sensor that images at least one target, and an image generation unit that generates a virtual image corresponding to at least one of the targets which are moving among the imaged targets.

10 Claims, 28 Drawing Sheets

(51) Int. Cl.
*G06F 3/01* (2006.01)
*G06F 3/16* (2006.01)

(56) References Cited

U.S. PATENT DOCUMENTS

| | | |
|---|---|---|
| 2011/0205242 A1 | 8/2011 | Friesen |
| 2012/0143361 A1* | 6/2012 | Kurabayashi ......... G06T 19/006 700/94 |
| 2012/0146998 A1* | 6/2012 | Kim ................... G06T 19/006 345/419 |
| 2012/0170800 A1 | 7/2012 | da Silva Frazao et al. |
| 2013/0083011 A1* | 4/2013 | Geisner .................... G09G 5/00 345/419 |
| 2013/0182114 A1* | 7/2013 | Zhang ...................... H04N 7/18 348/150 |
| 2013/0201188 A1 | 8/2013 | Choi et al. |
| 2013/0201201 A1* | 8/2013 | Morinaga ................ G09G 5/02 345/589 |
| 2013/0271491 A1* | 10/2013 | Anderson ............... G06T 11/60 345/633 |
| 2014/0002496 A1* | 1/2014 | Lamb ....................... G06F 3/14 345/633 |
| 2015/0062117 A1* | 3/2015 | Reitmayr ............... G06T 15/00 345/419 |
| 2015/0097767 A1* | 4/2015 | Park ....................... G06T 15/20 345/156 |
| 2015/0109322 A1 | 4/2015 | Friesen |
| 2015/0117831 A1 | 4/2015 | Hanai |
| 2015/0228121 A1* | 8/2015 | Tsukahara ........... G06F 3/04817 345/419 |
| 2015/0261184 A1* | 9/2015 | Mannion ................ G06T 17/00 348/41 |
| 2015/0264338 A1* | 9/2015 | Ueno ..................... G06F 1/163 345/173 |
| 2015/0348323 A1* | 12/2015 | Davis .................... G06T 19/006 345/419 |
| 2016/0093107 A1* | 3/2016 | Yamamoto .............. A63F 13/92 345/633 |
| 2016/0203647 A1 | 7/2016 | Friesen |
| 2016/0224176 A1* | 8/2016 | Kim ...................... G06F 3/0416 |
| 2016/0325170 A1* | 11/2016 | Ro ..................... G09B 19/0038 |
| 2017/0064214 A1* | 3/2017 | Zhang .................... H04N 5/265 |
| 2017/0256283 A1* | 9/2017 | Yajima .................. G11B 20/10 |
| 2018/0286131 A1 | 10/2018 | Friesen |

OTHER PUBLICATIONS

Yu Suzuki et al. "Cooking Support With Information Projection Onto Ingredient". Kyoto Sangyo University, pp. 19-24, Jun. 2012.

* cited by examiner

[Fig. 1]
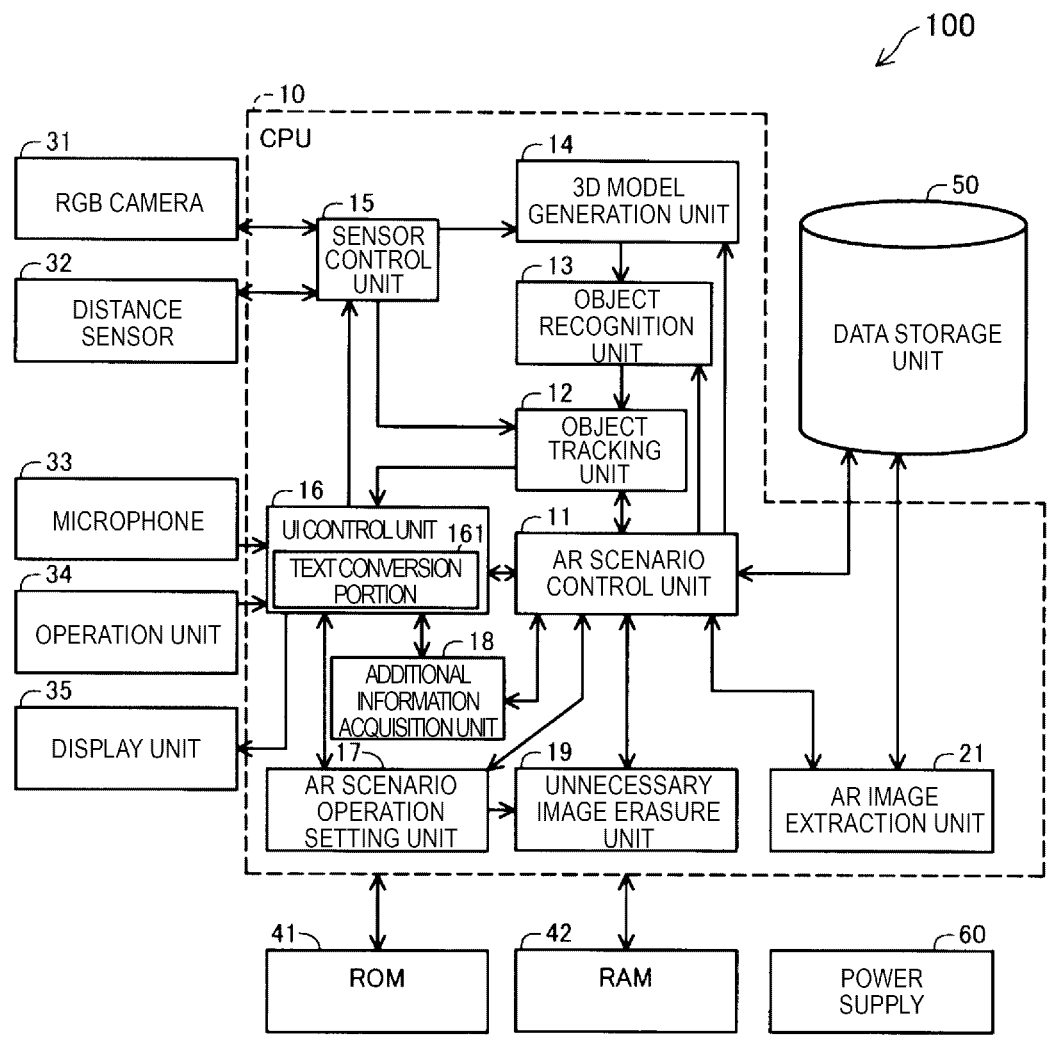

[Fig. 2]
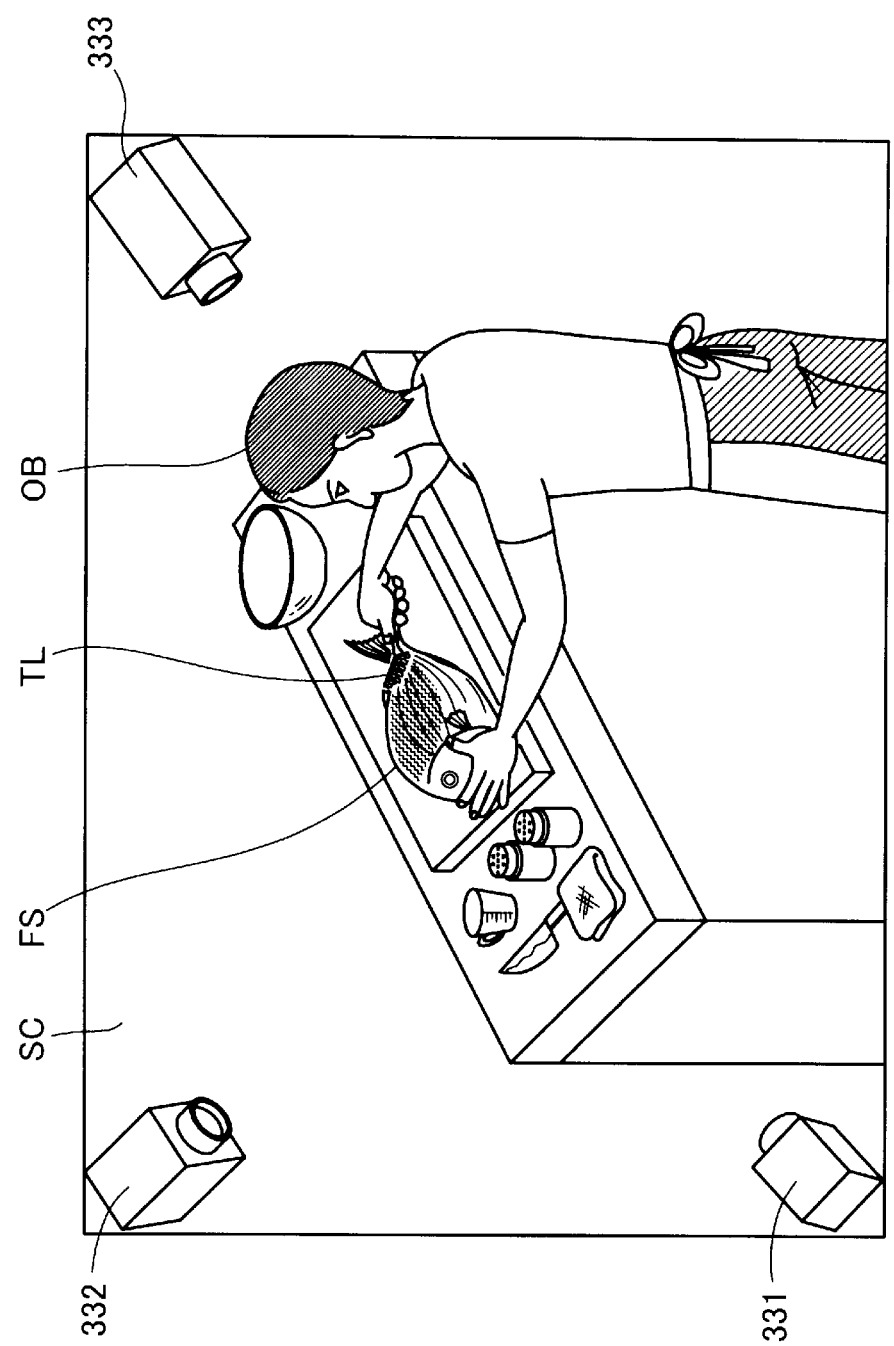

[Fig. 3]
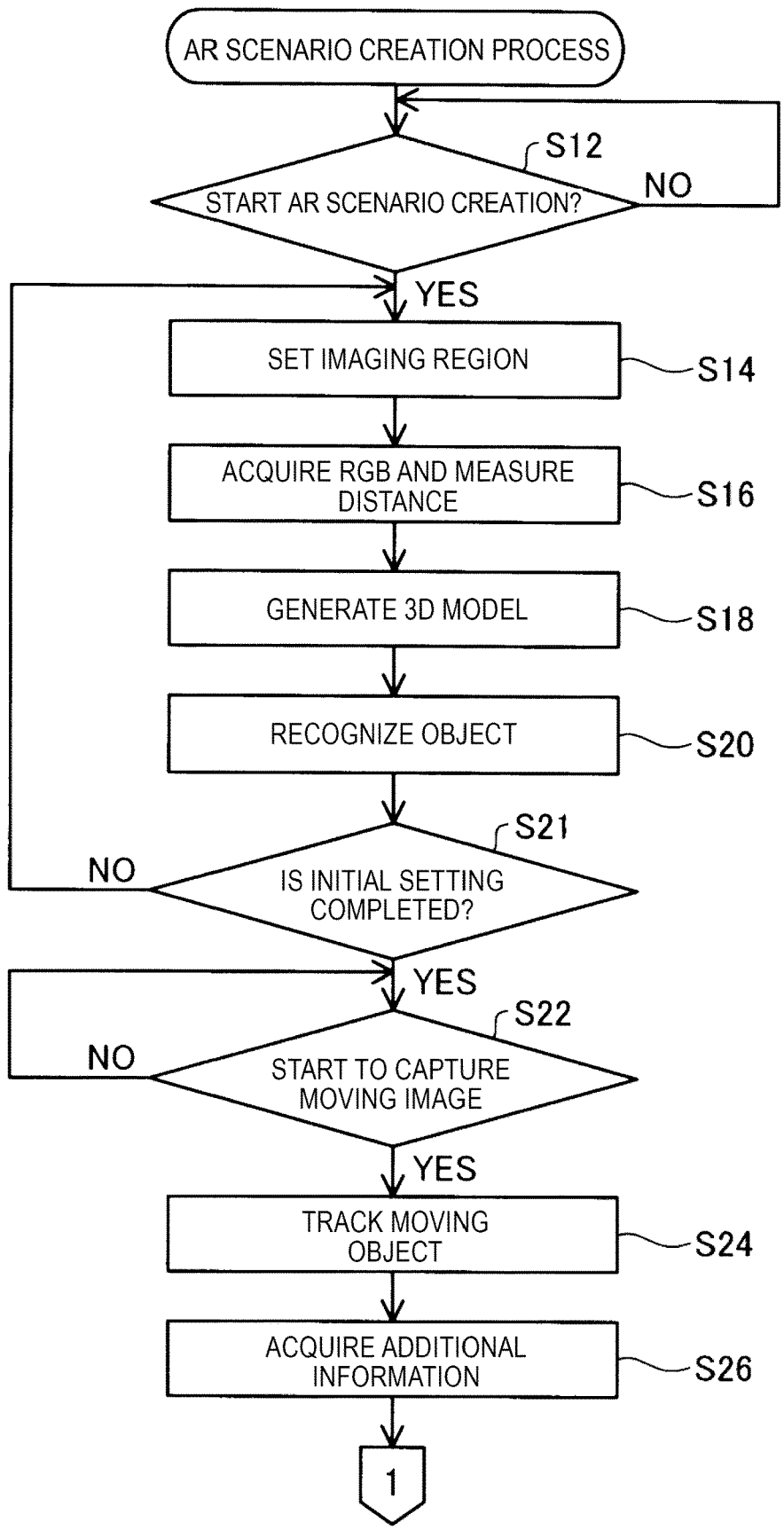

[Fig. 4]
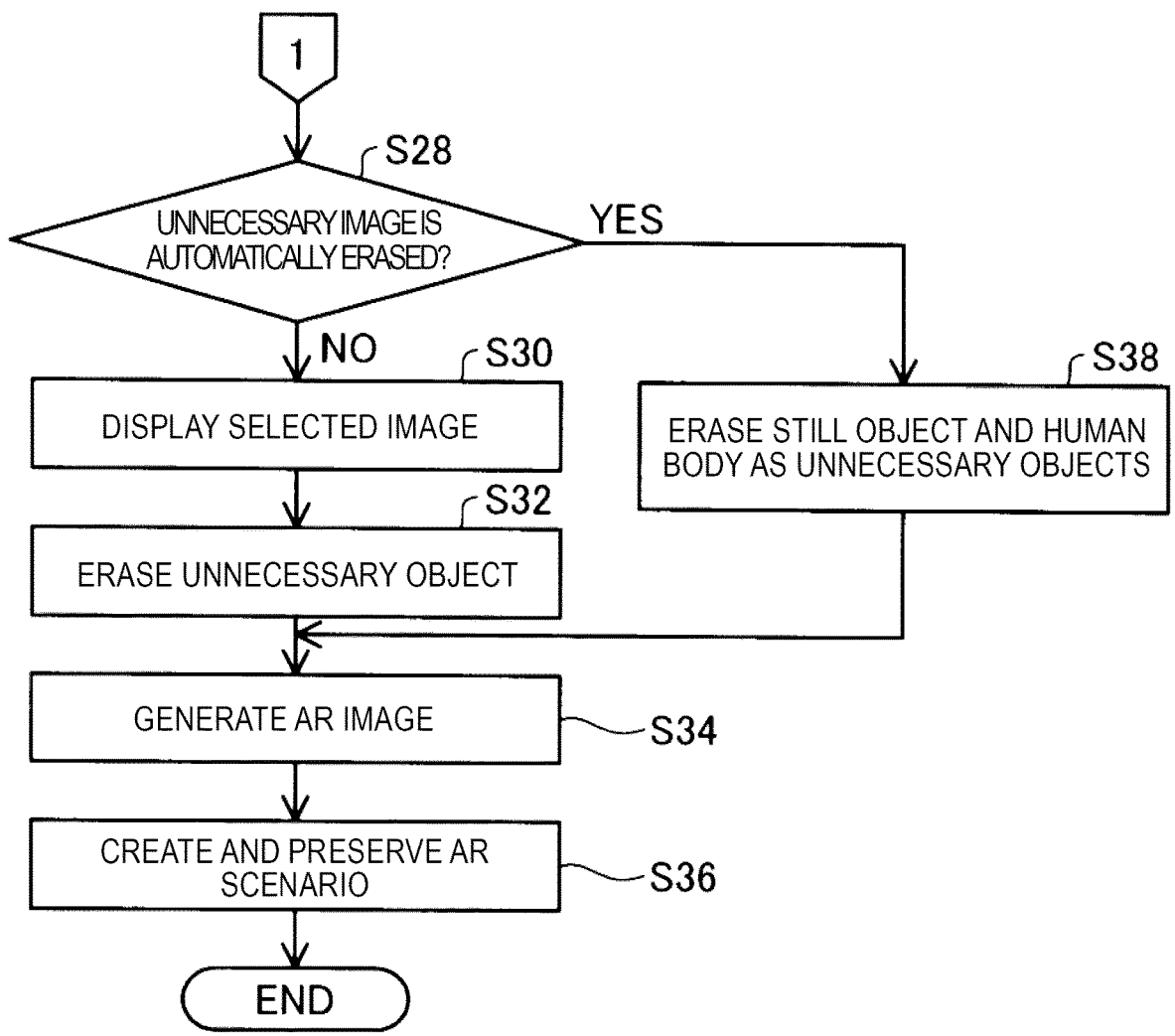

[Fig. 5]
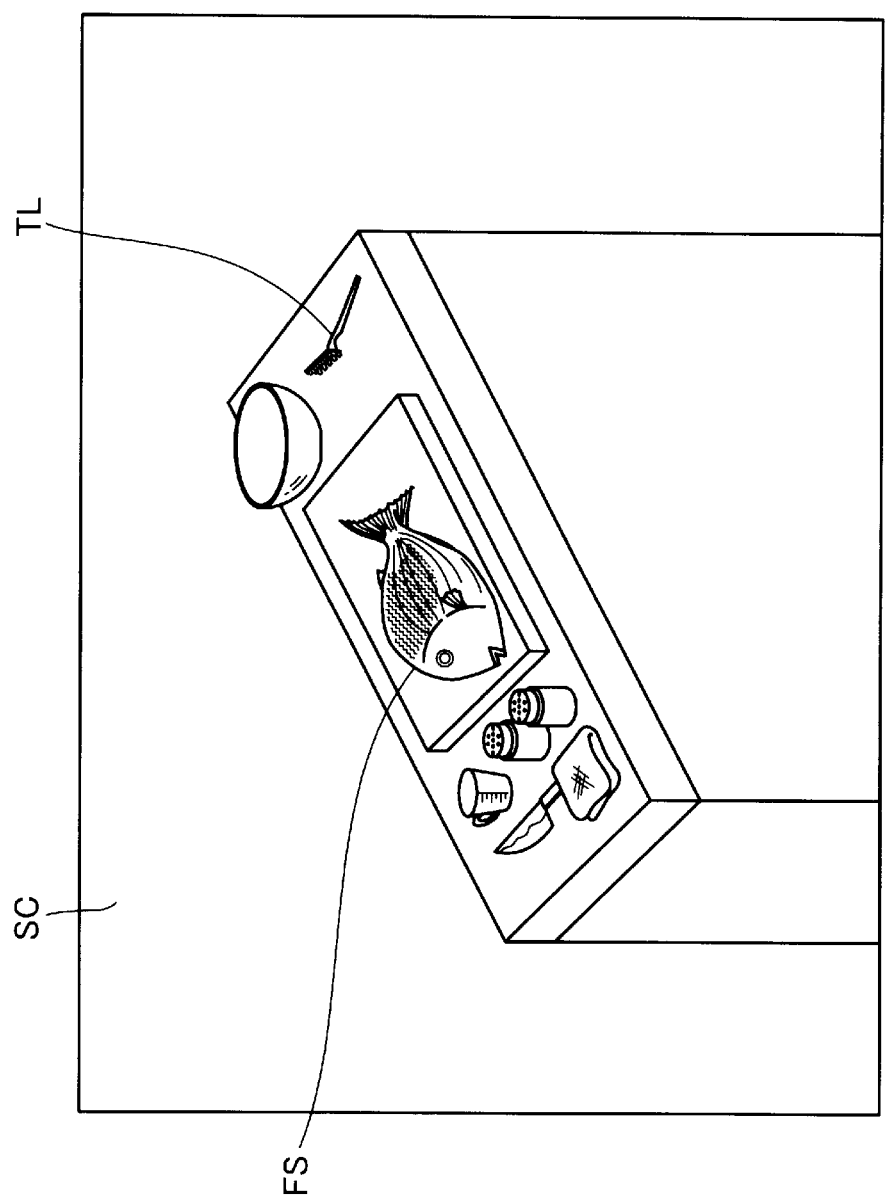

[Fig. 6]
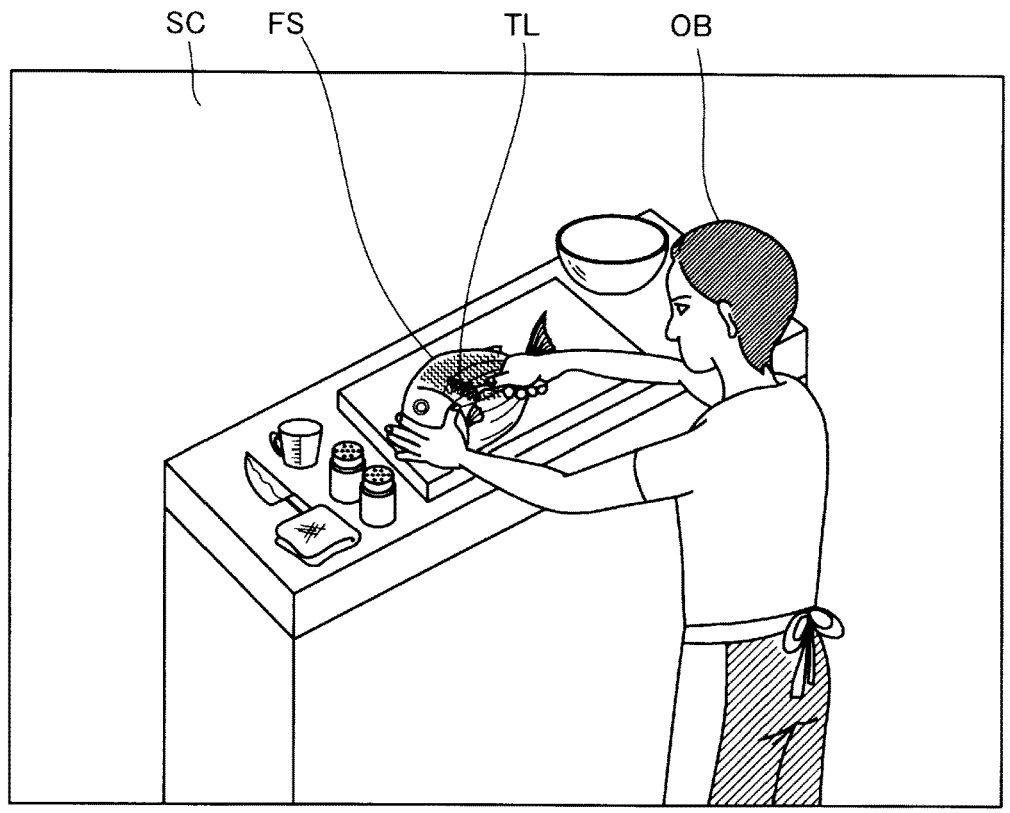
[Fig. 7]
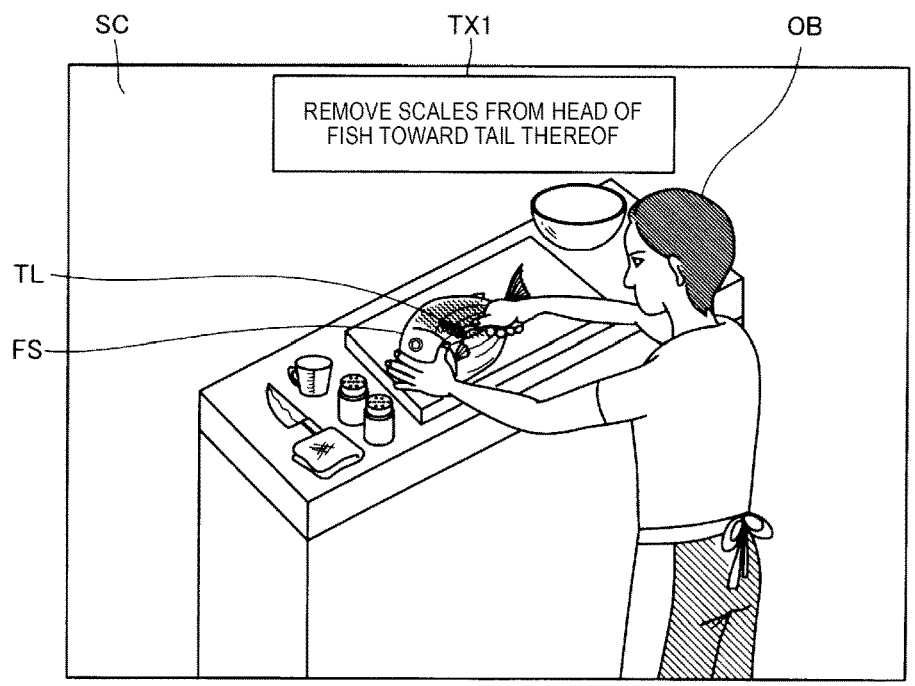

[Fig. 8]
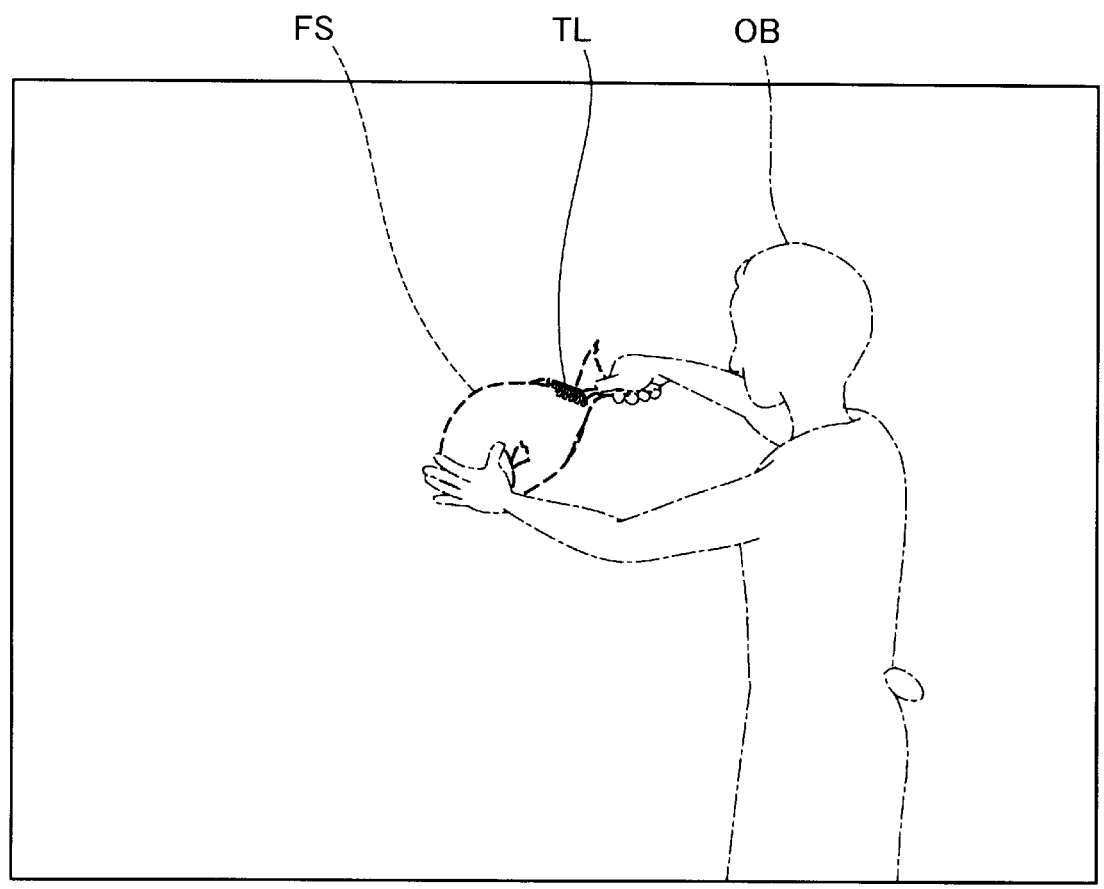
[Fig. 9]
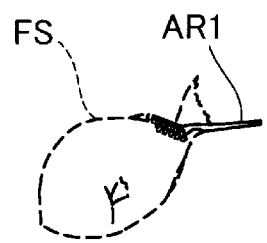

[Fig. 10]
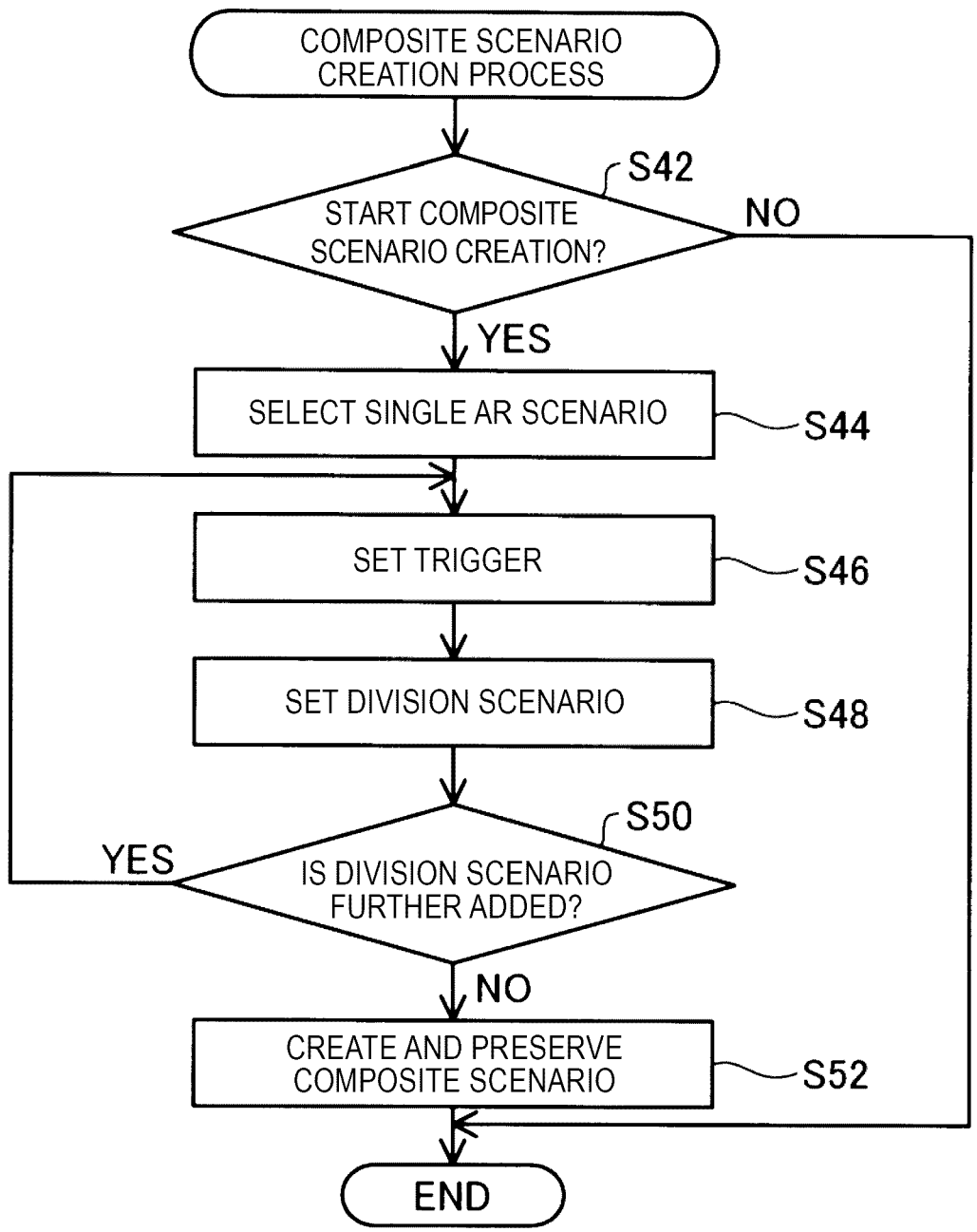

[Fig. 11]
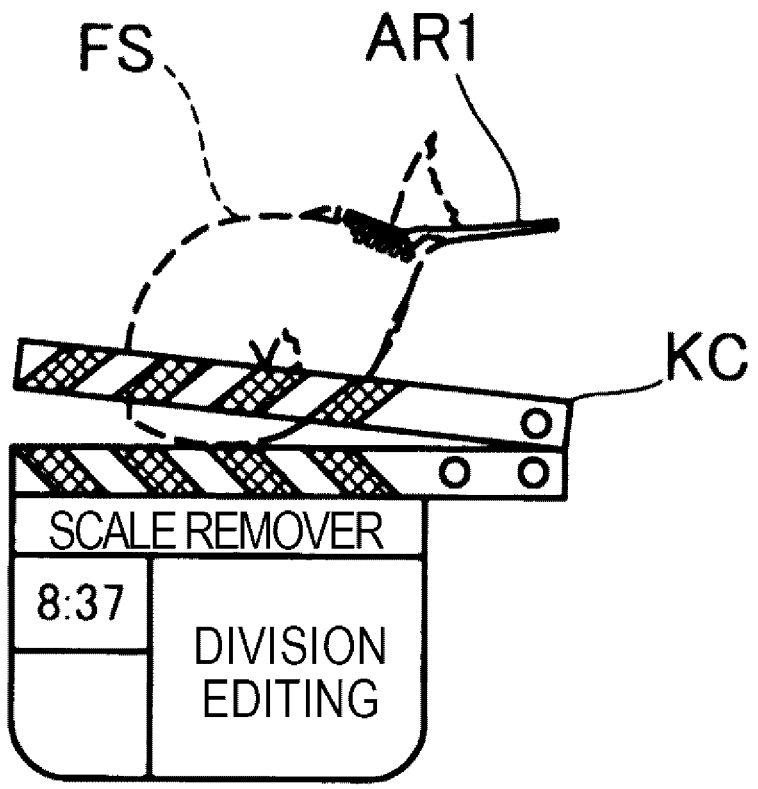
[Fig. 12]
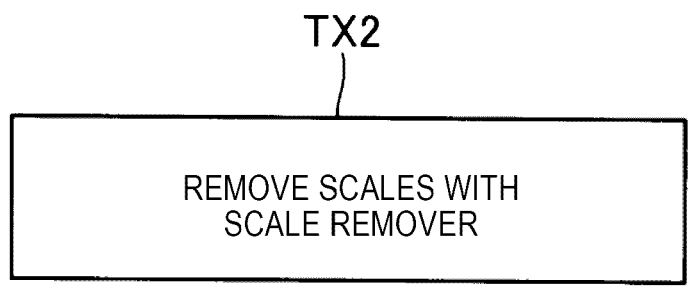
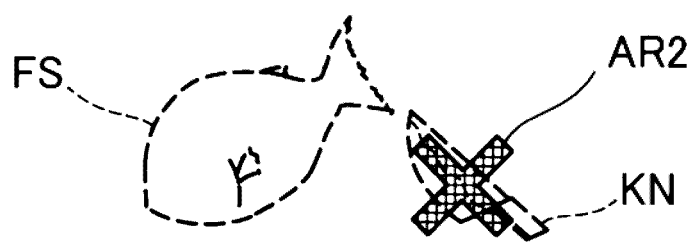

[Fig. 13]
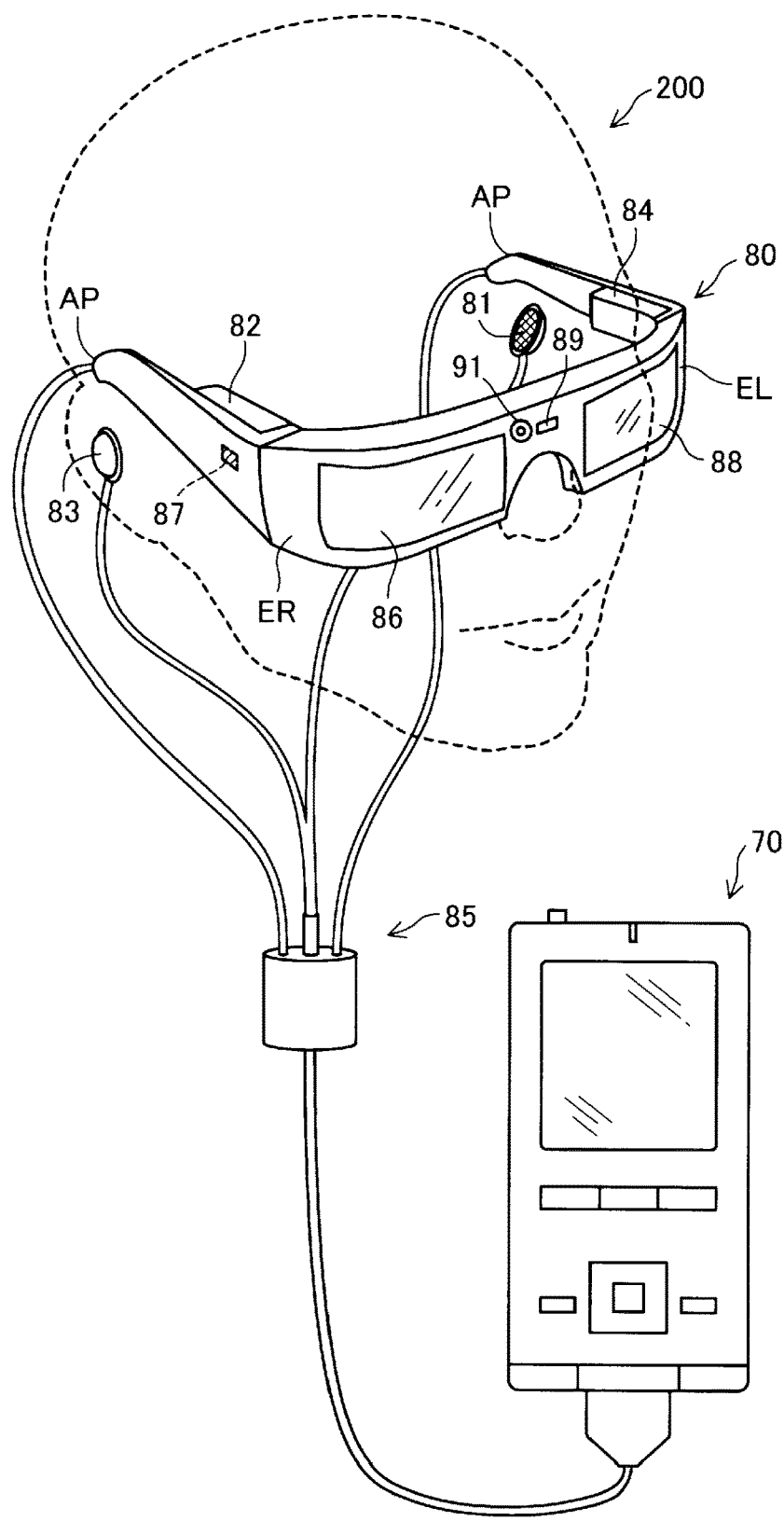

[Fig. 14]
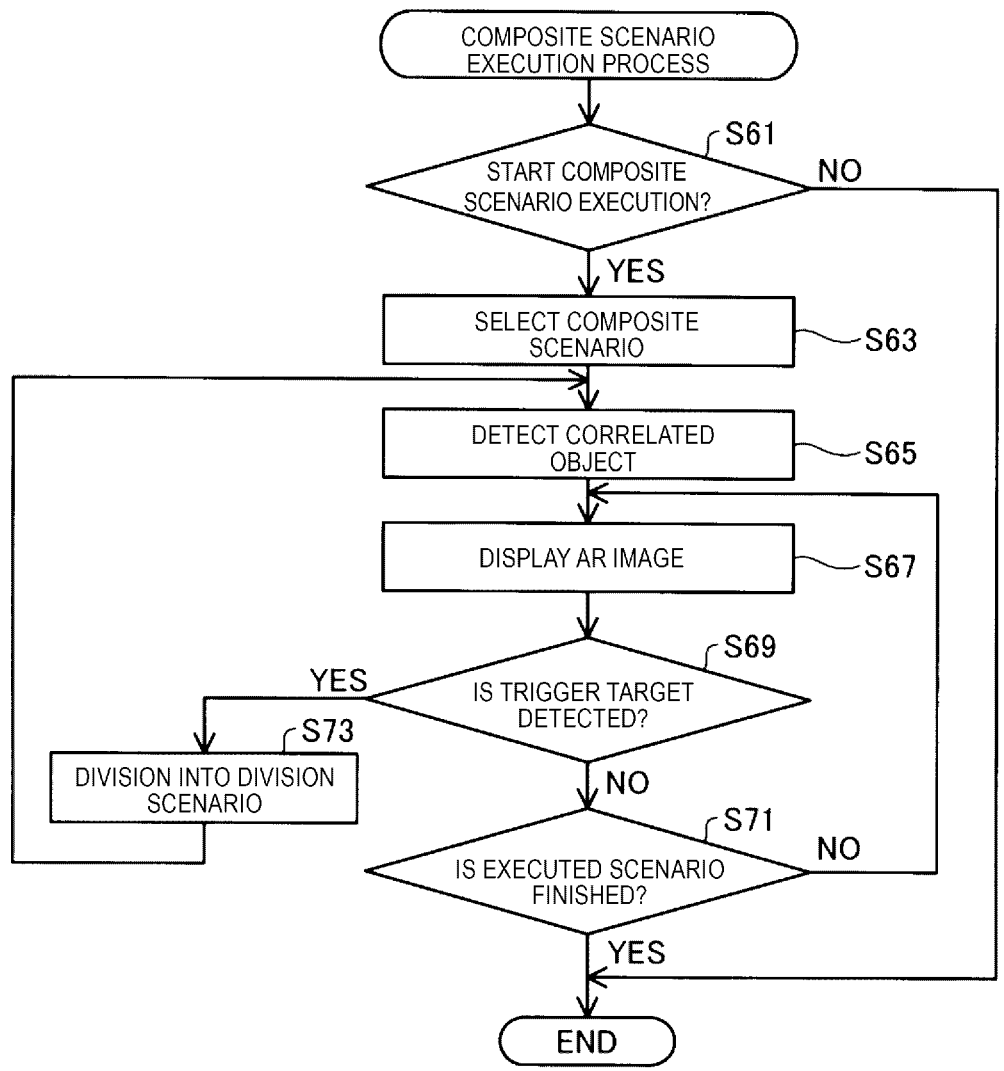

[Fig. 15]
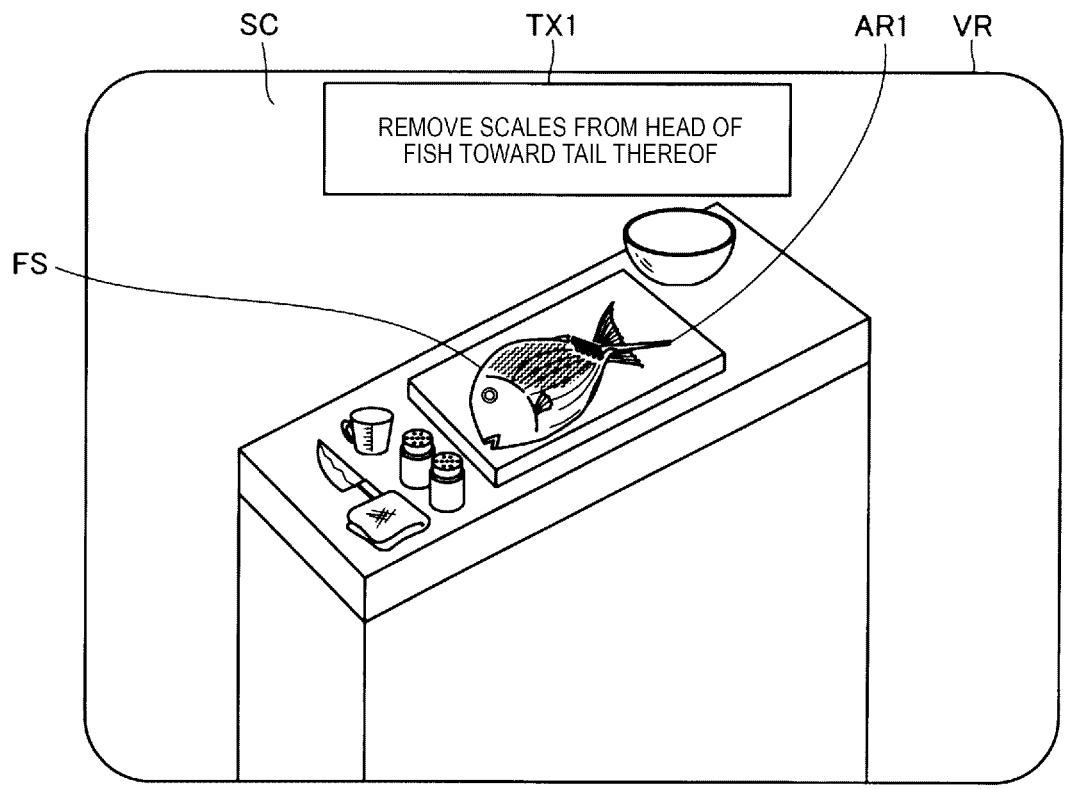
[Fig. 16]
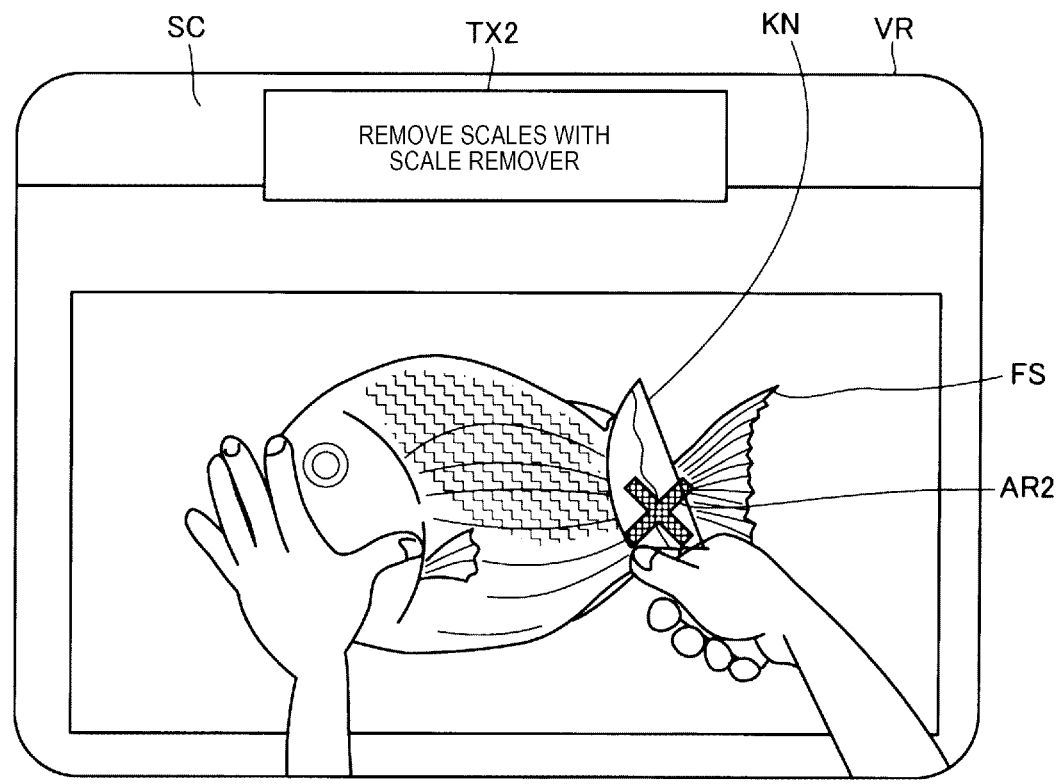

[Fig. 17]
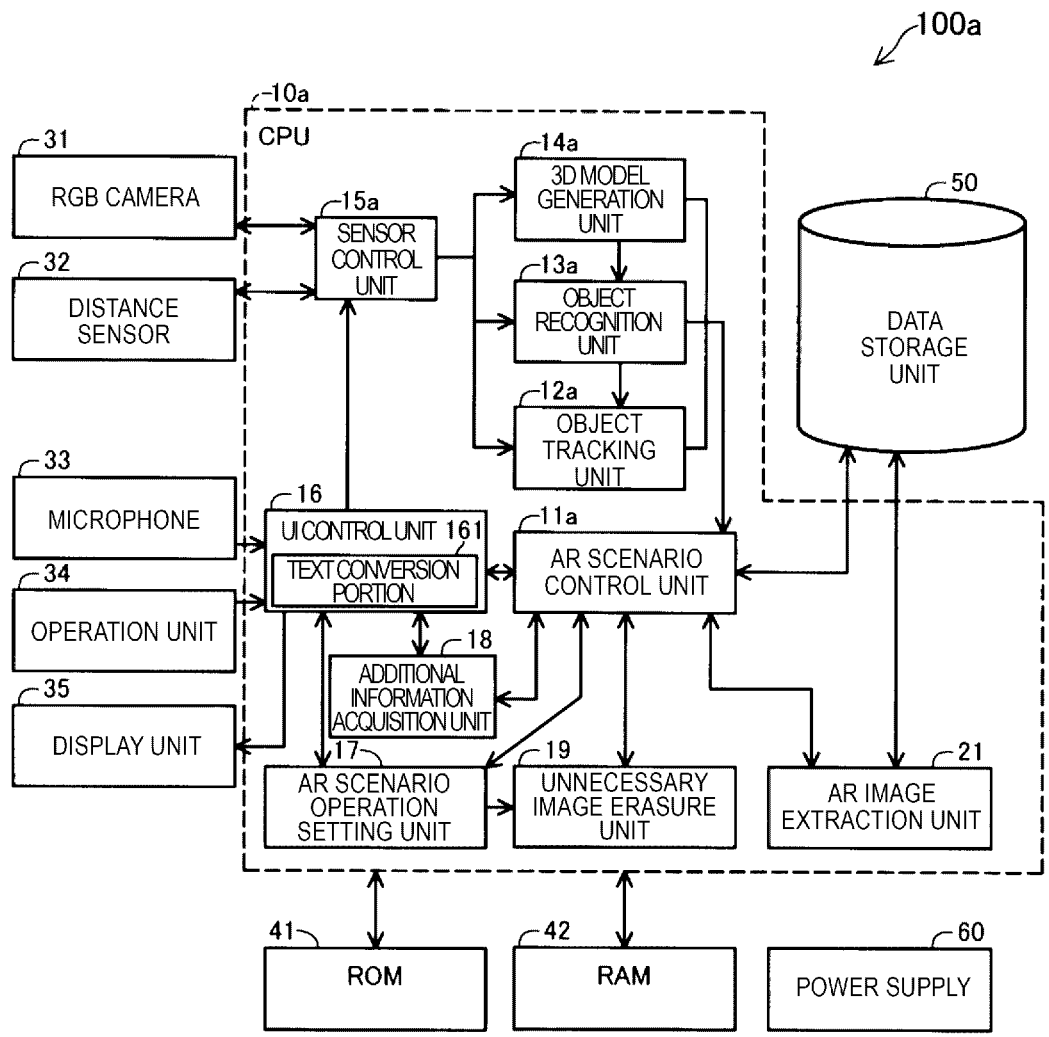

[Fig. 18]
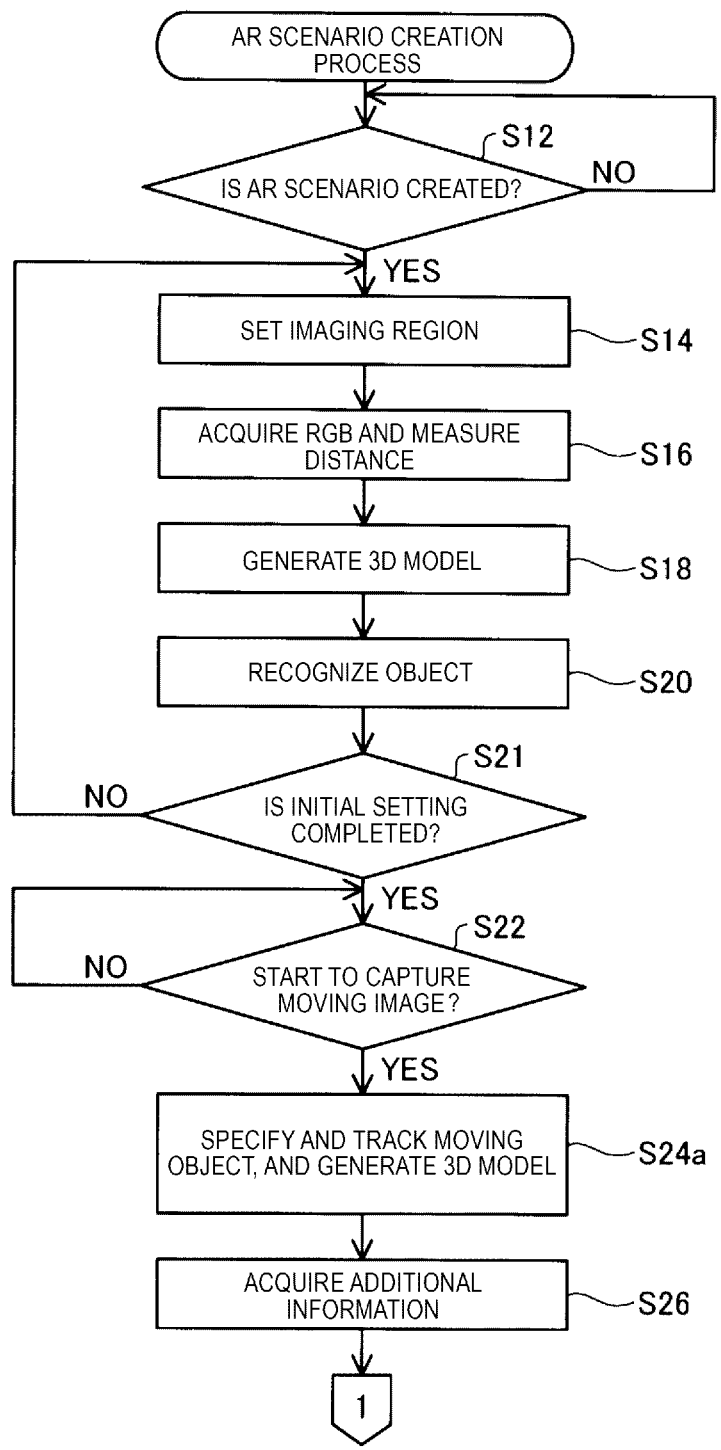

[Fig. 19]
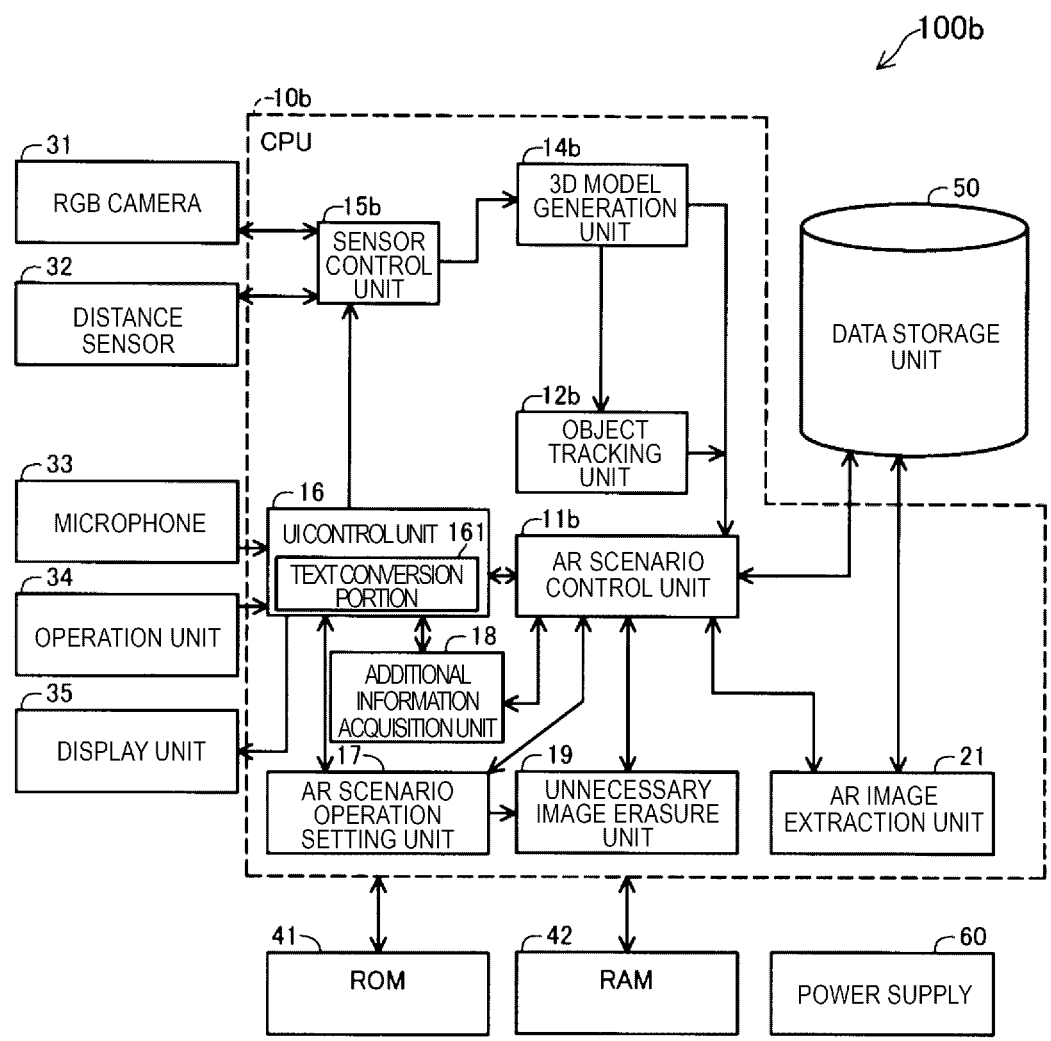

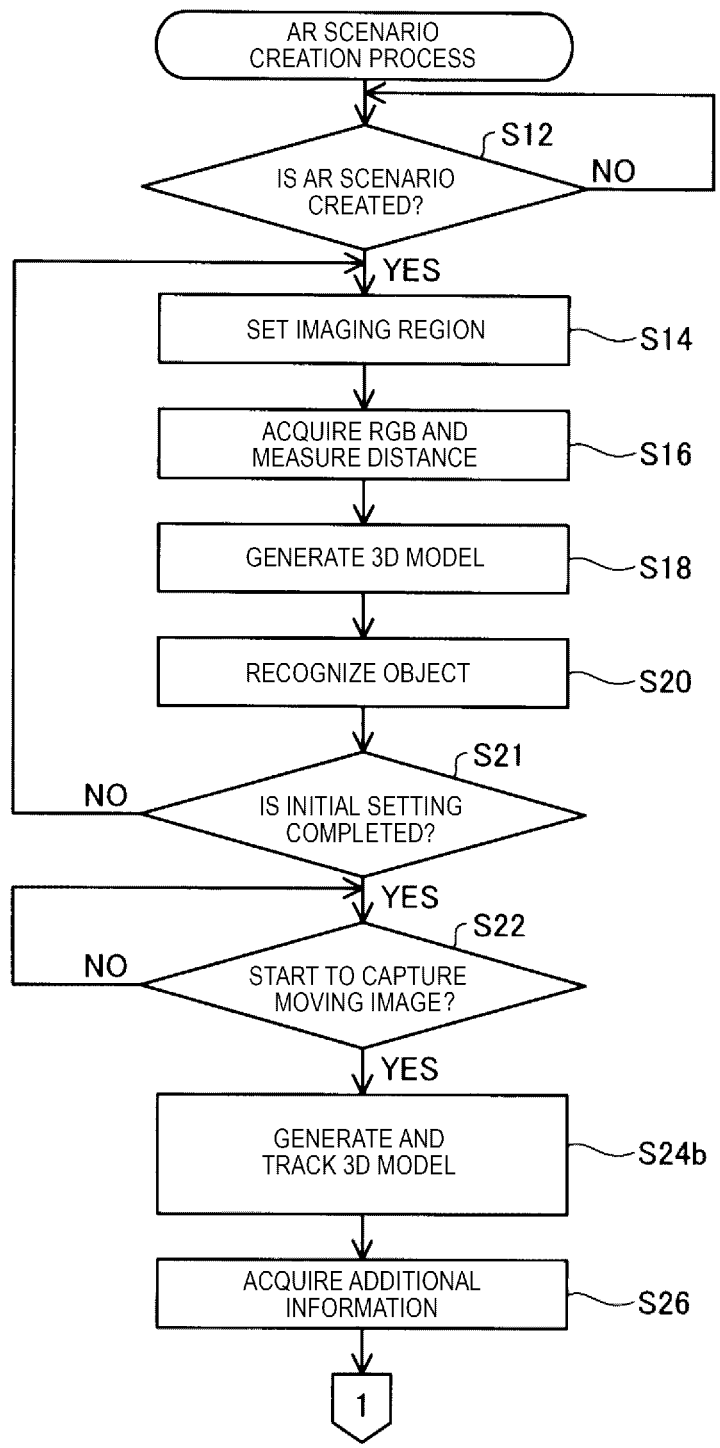

[Fig. 21]
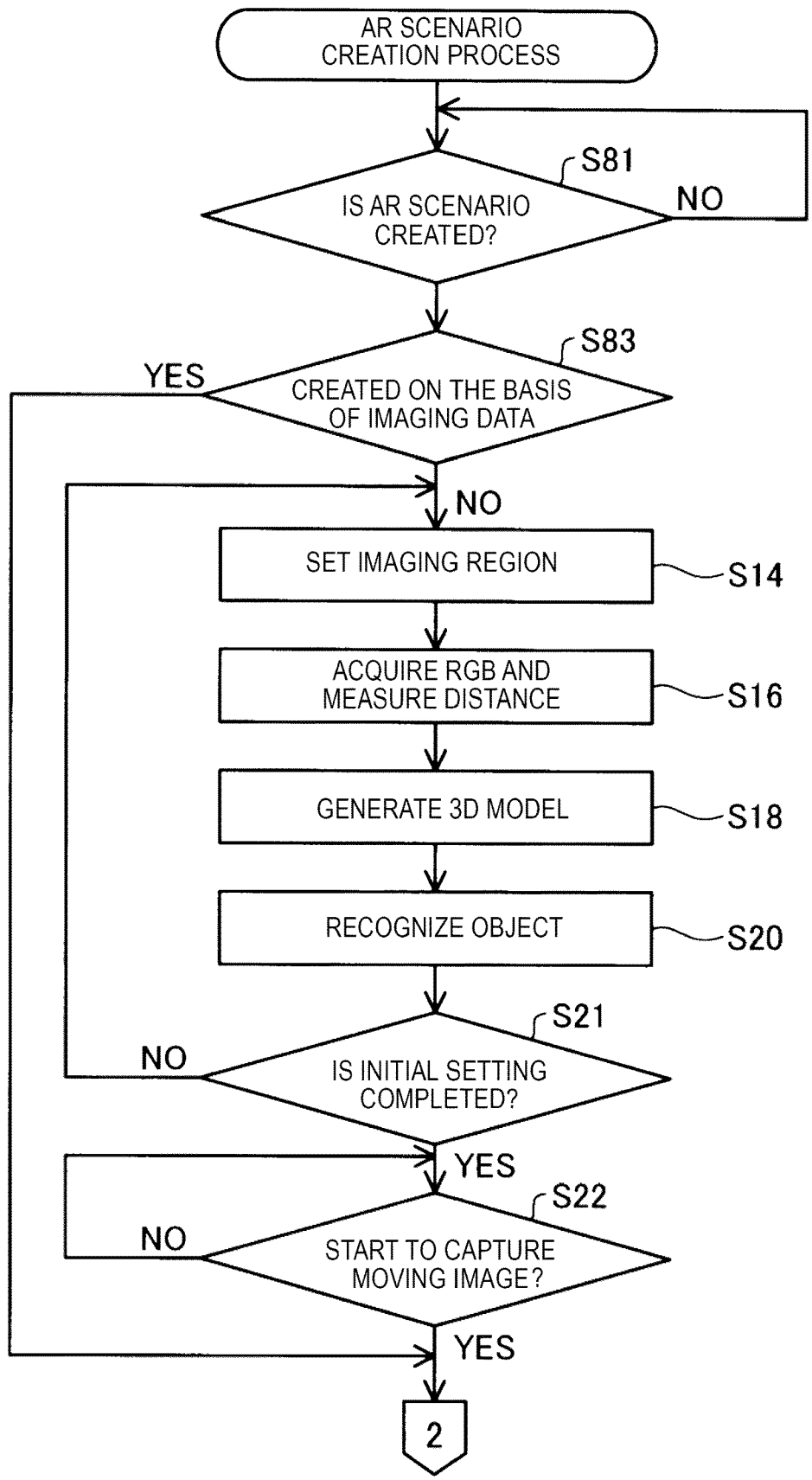

[Fig. 22]
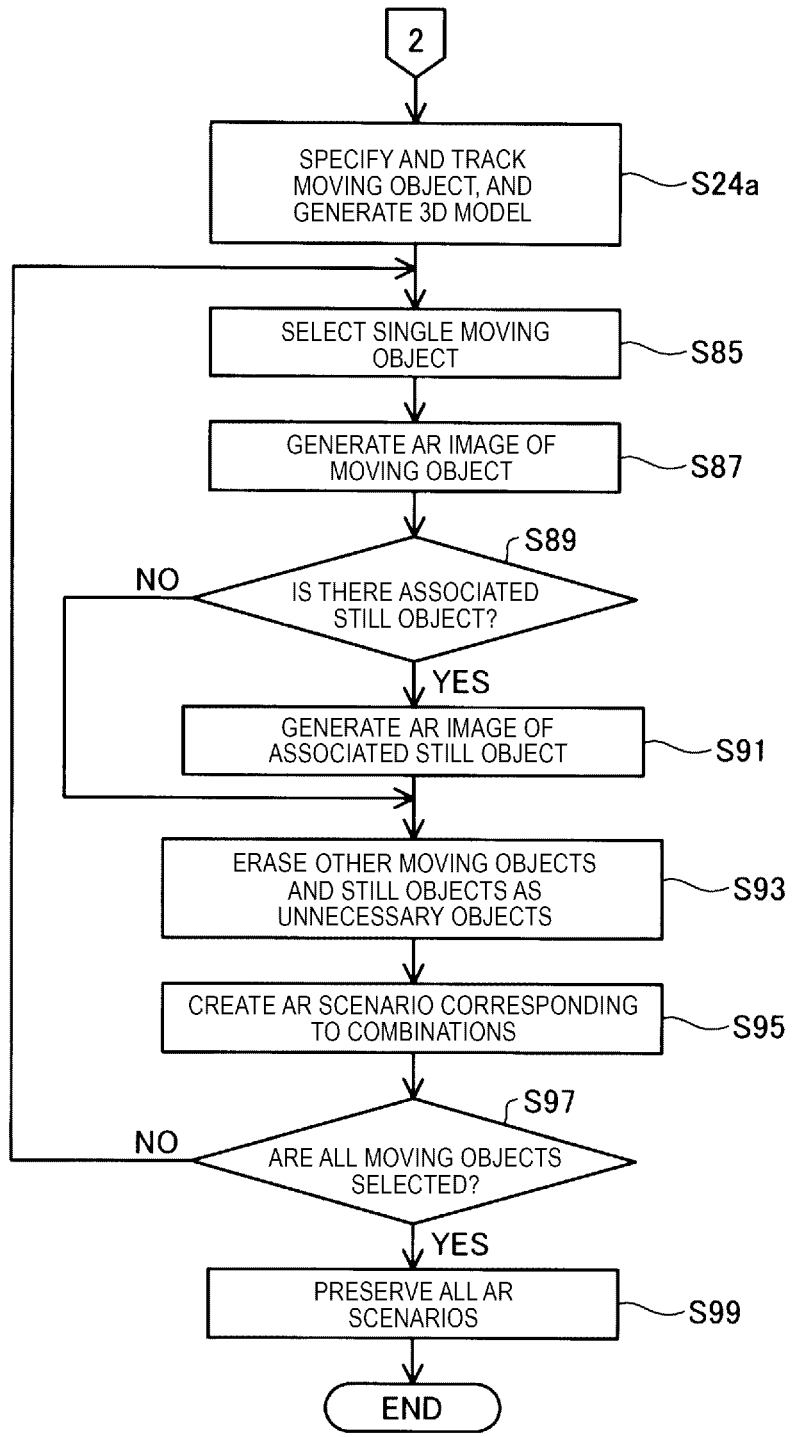

[Fig. 23]
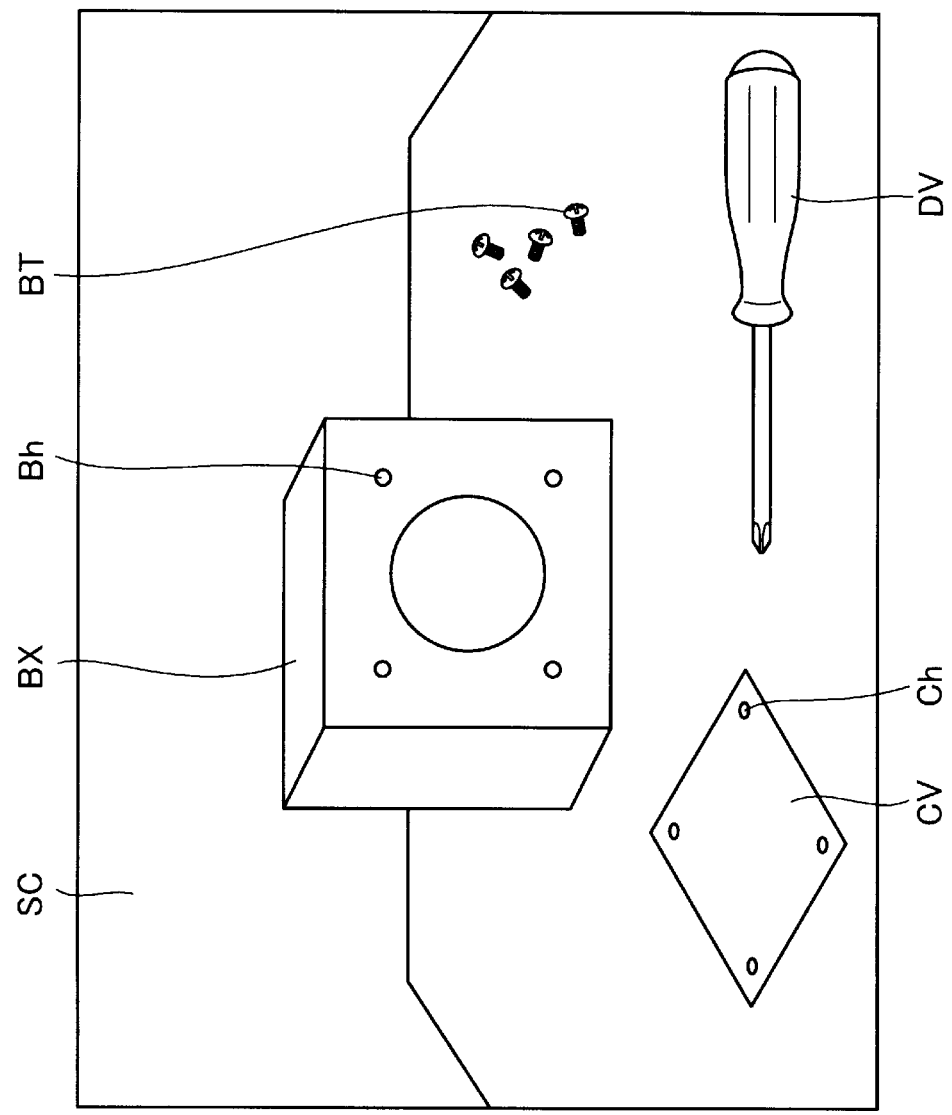

[Fig. 24]
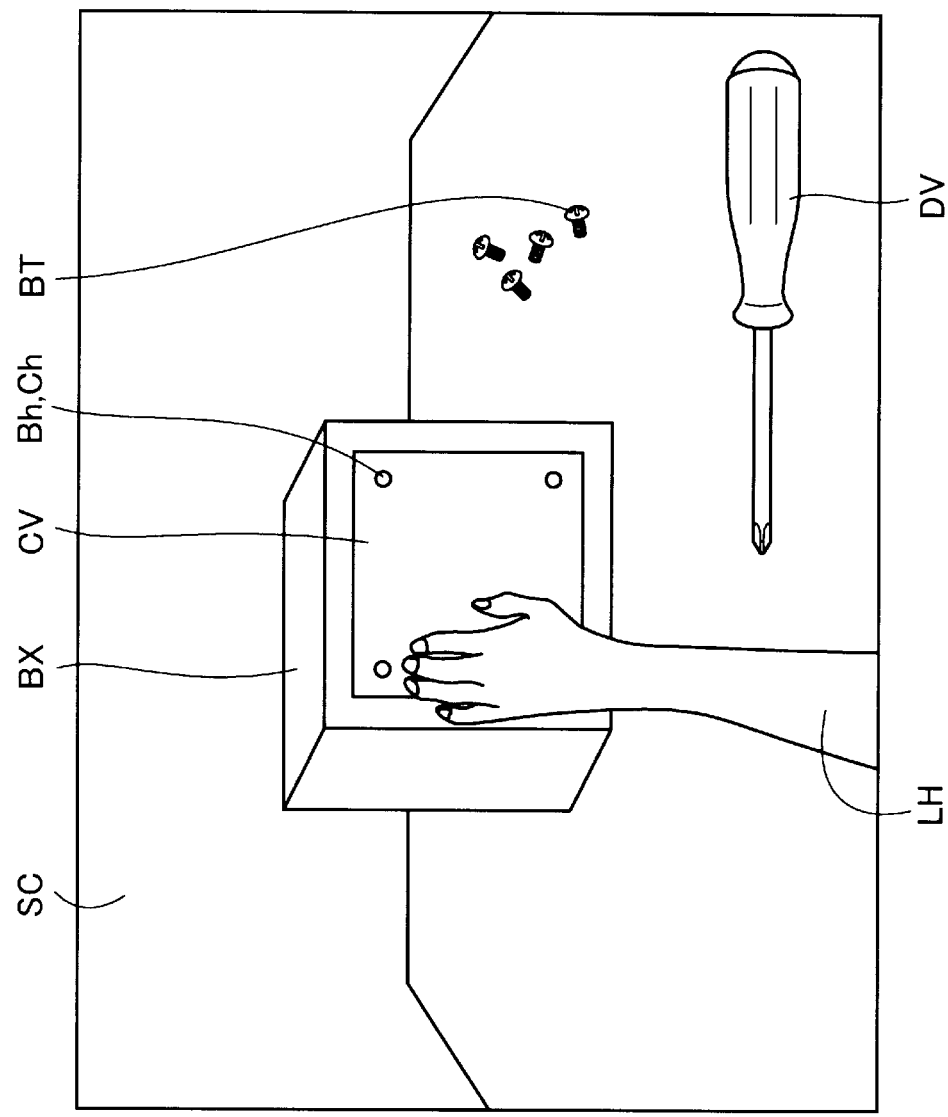

[Fig. 25]
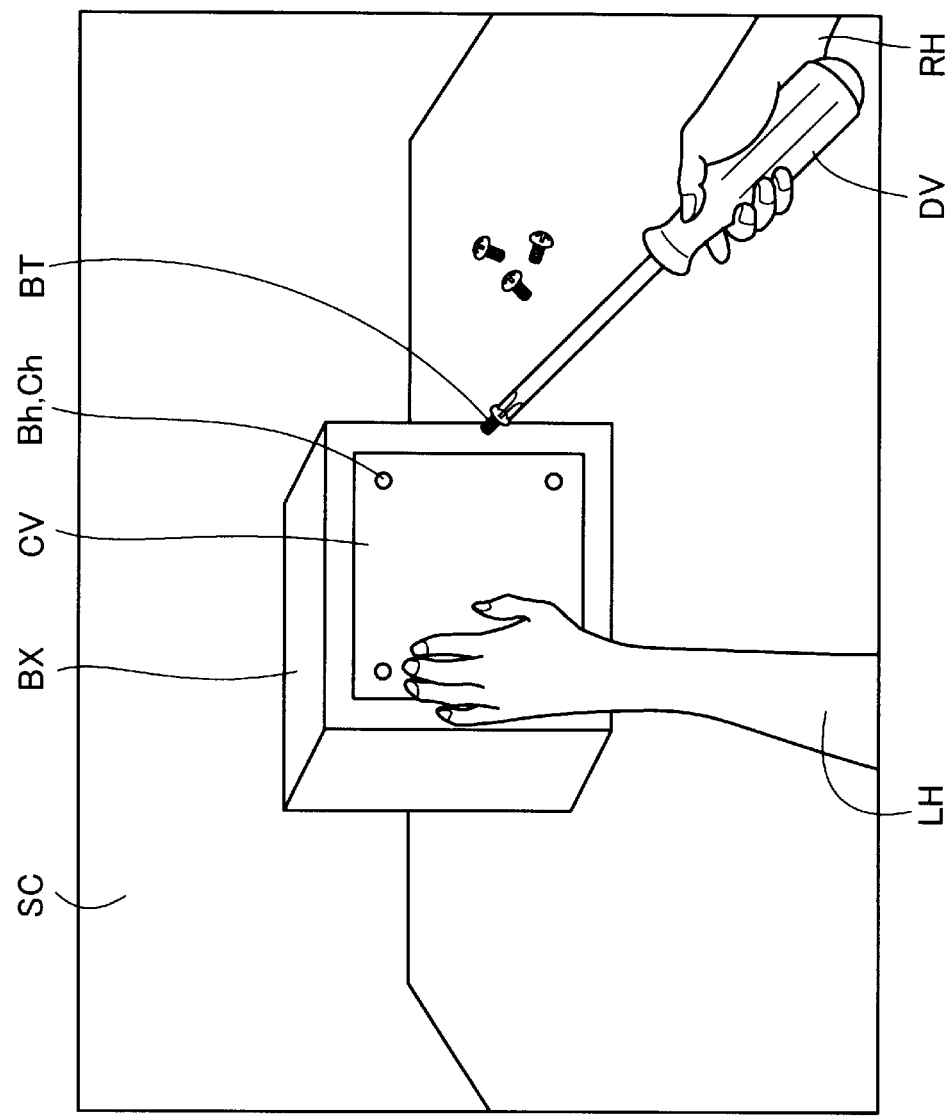

[Fig. 26]
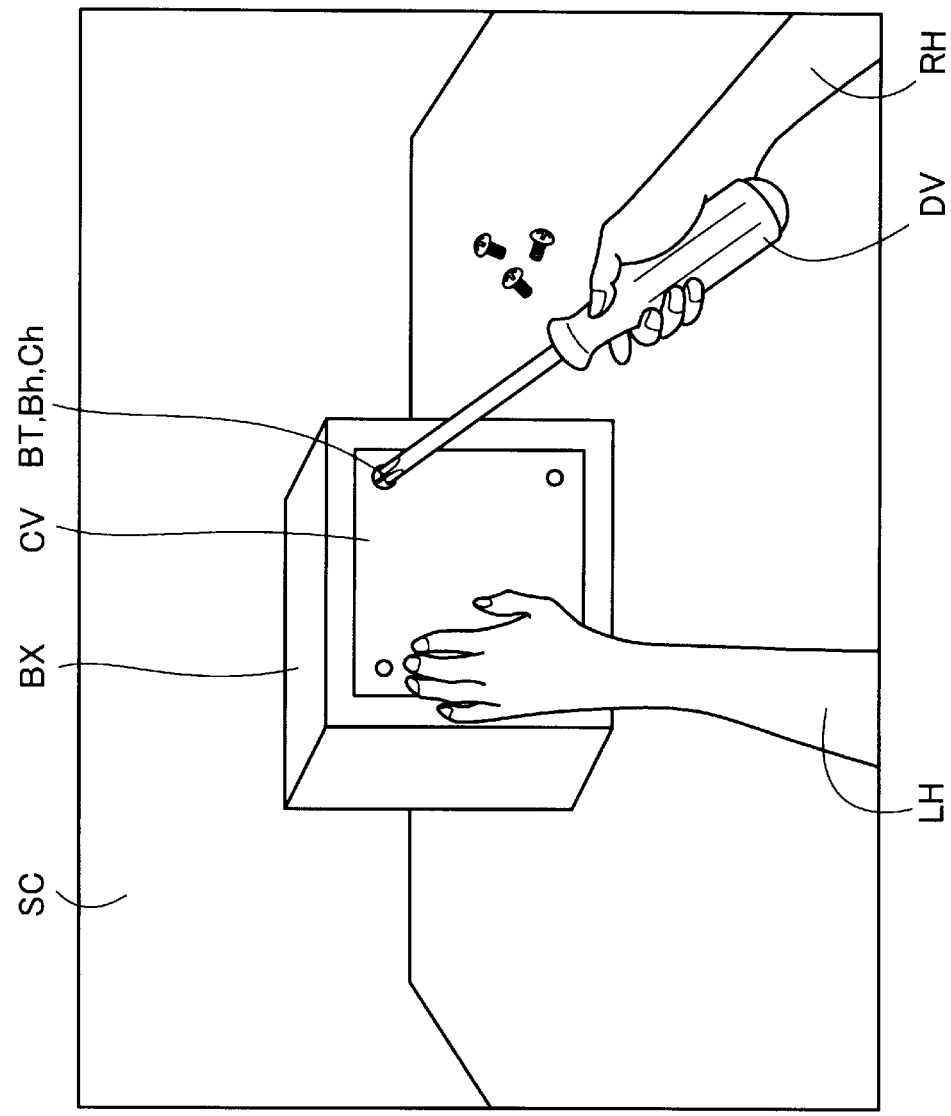

[Fig. 27]

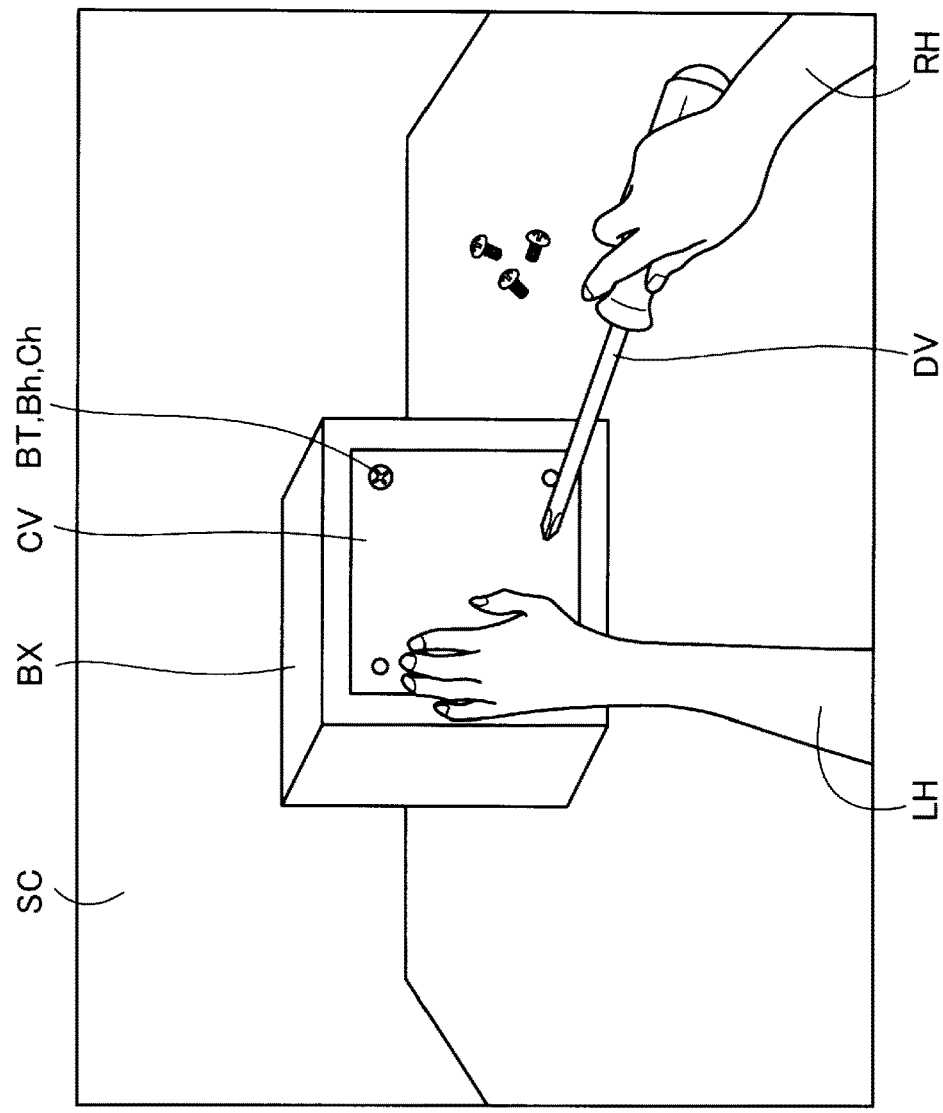

[Fig. 28]

| | COMBINATION | DISPLAY IMAGE |
|---|---|---|
| 1 | ONLY MOVING OBJECT | IMAGE OF ASSOCIATED STILL OBJECT |
| 2 | ONLY ASSOCIATED STILL OBJECT | IMAGE OF MOVING OBJECT INTEGRATED WITH DETECTED ASSOCIATED STILL OBJECT |
| 3 | MOVING OBJECT AND ASSOCIATED STILL OBJECT | IMAGE OF MOVING OBJECT INTEGRATED WITH DETECTED ASSOCIATED STILL OBJECT |
| 4 | NON-DETECTION | IMAGE IN WHICH MOVING OBJECT AND ASSOCIATED STILL OBJECT ARE INTEGRATED WITH EACH OTHER |

[Fig. 29]
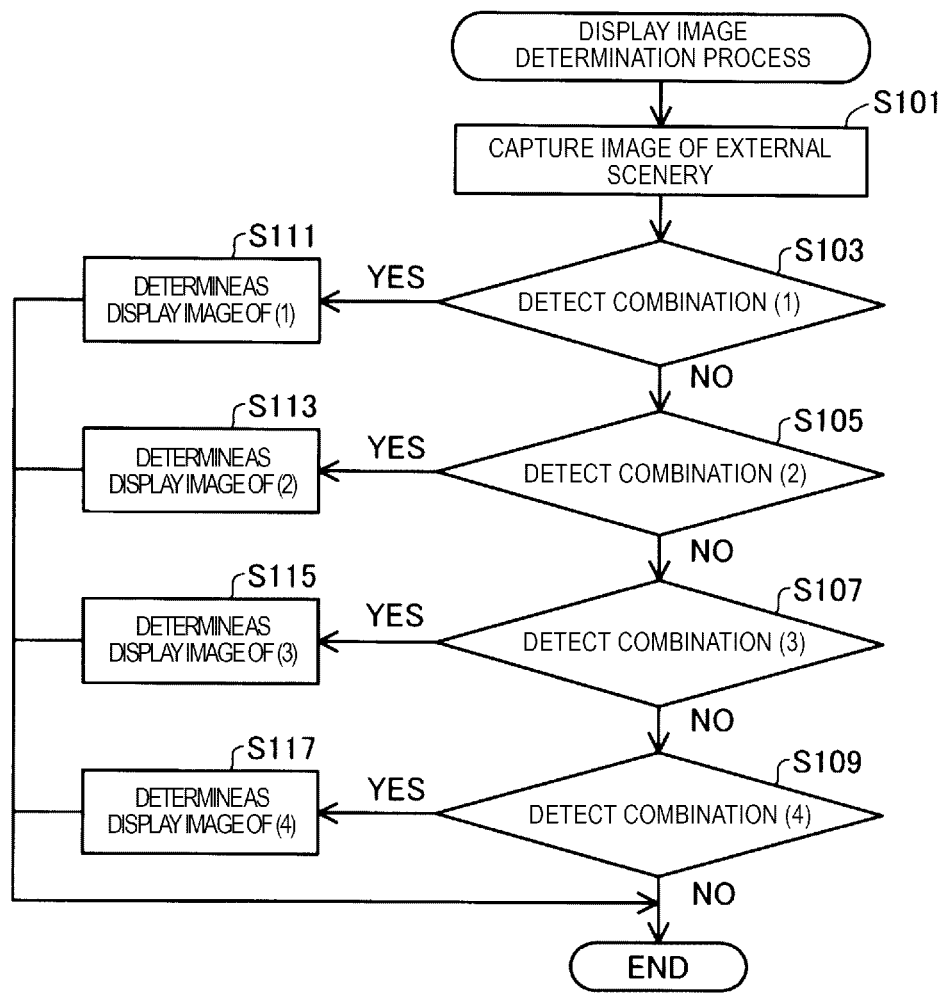

[Fig. 30]
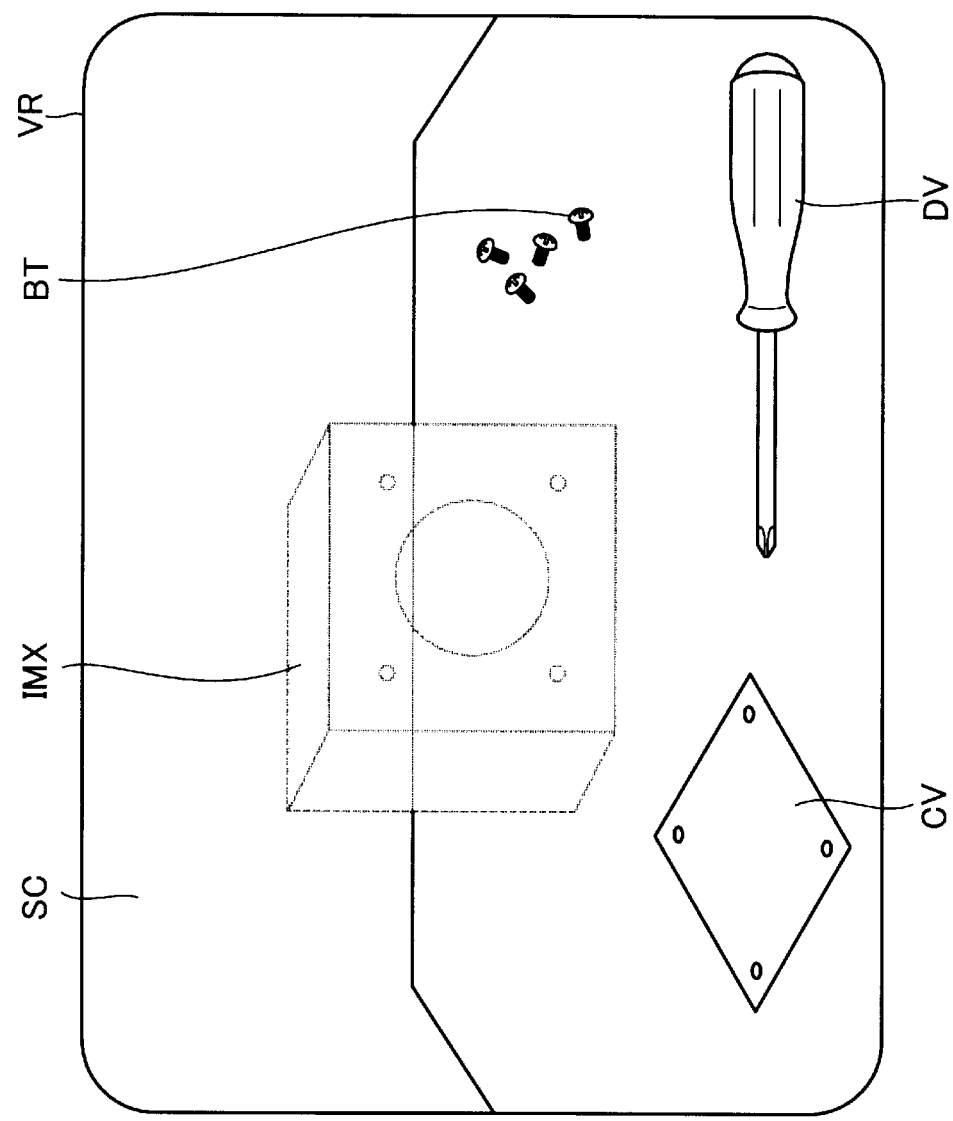

[Fig. 31]
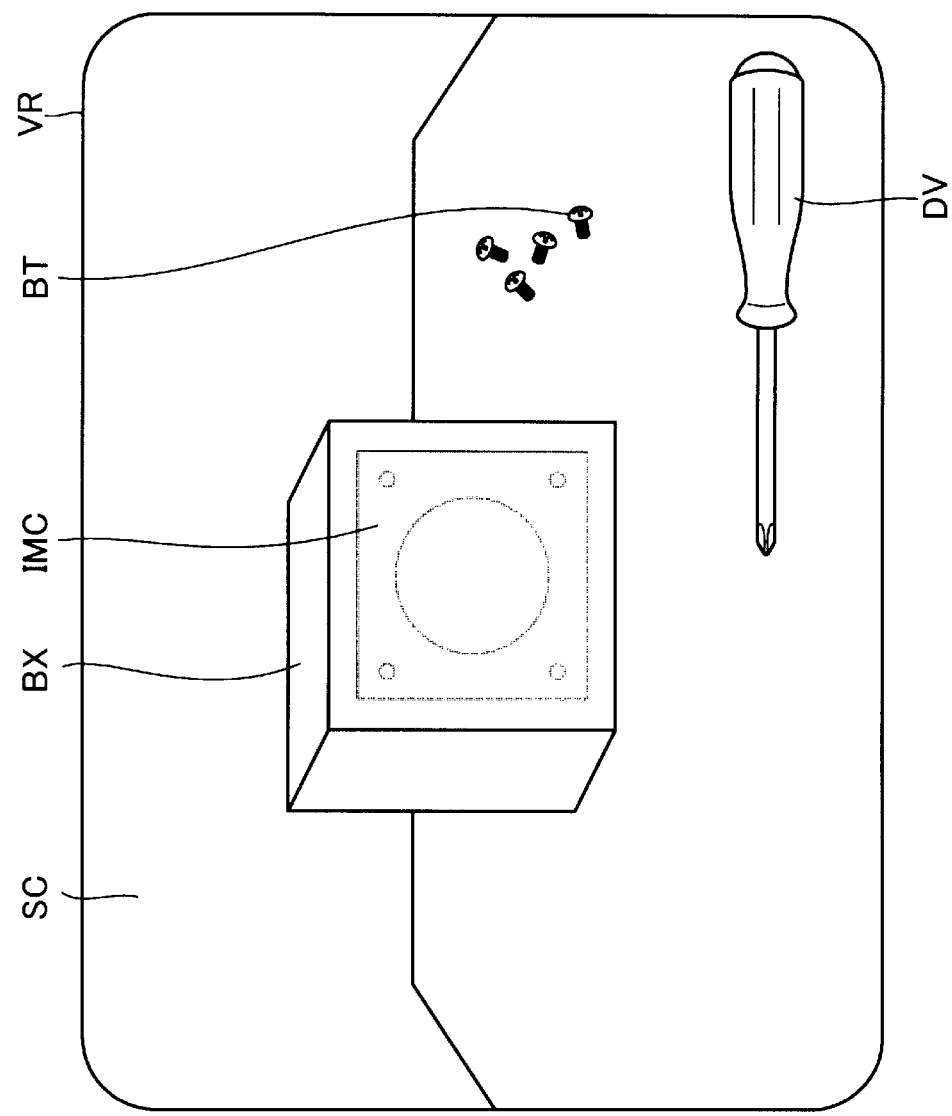

[Fig. 32]
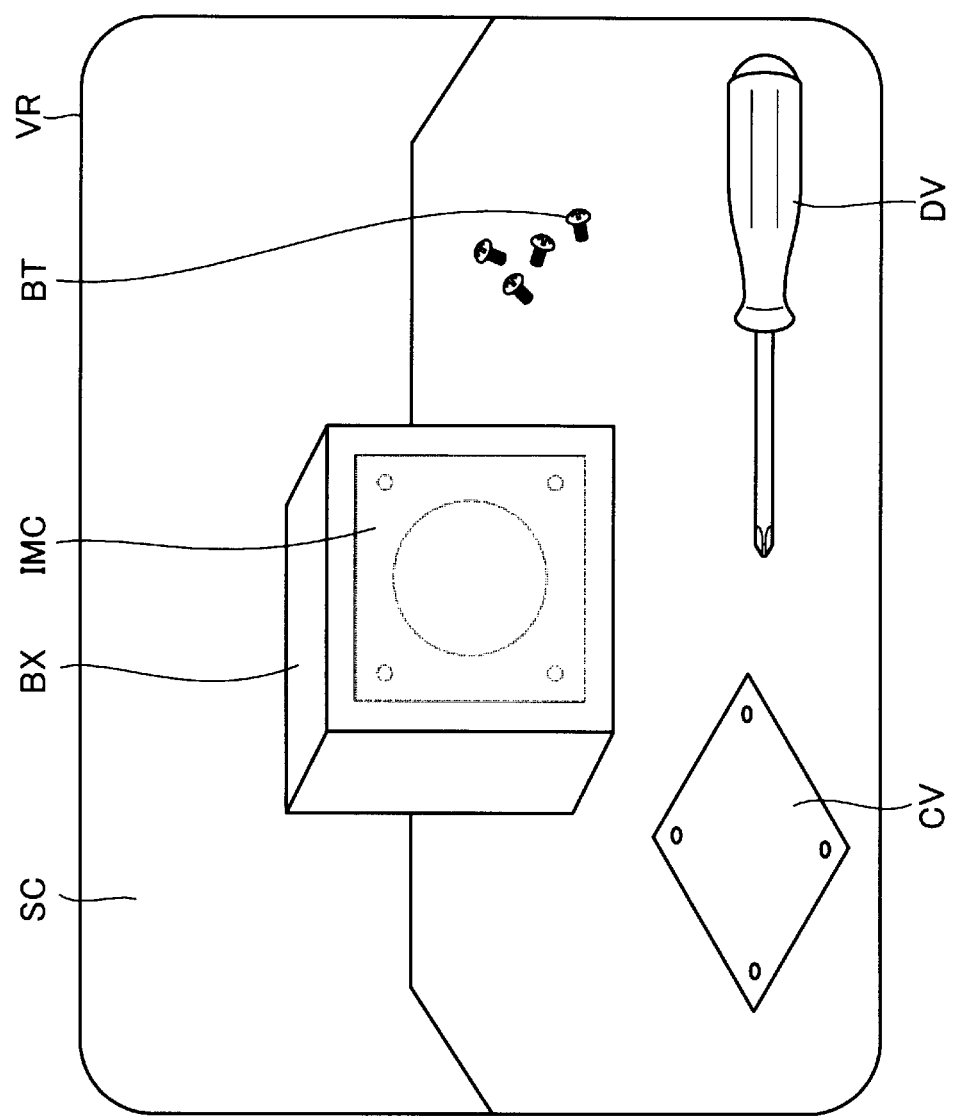

[Fig. 33]
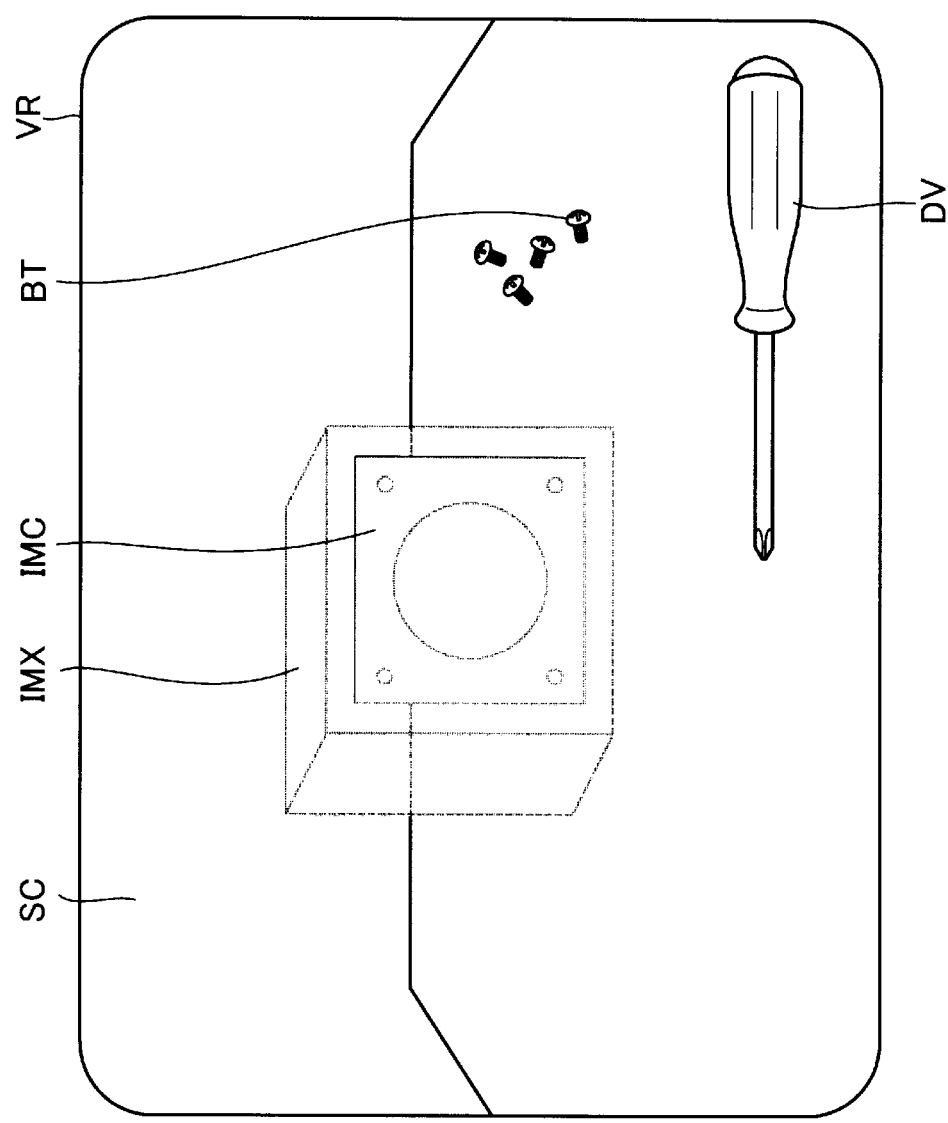

IMAGE PROCESSING APPARATUS, CONTROL METHOD FOR IMAGE PROCESSING APPARATUS, AND COMPUTER PROGRAM FOR GENERATING A VIRTUAL IMAGE CORRESPONDING TO A MOVING TARGET

TECHNICAL FIELD

The present invention relates to a technique of an image processing apparatus.

BACKGROUND ART

In the related art, as disclosed in PTL 1, there is a display apparatus in which, among actions of a subject whose videos are captured, an image generated so as to correspond to some actions is displayed in synchronization with a moving image of the subject whose videos are captured.

CITATION LIST

Patent Literature

PTL 1: JP-A-2002-230086

SUMMARY OF INVENTION

Technical Problem

However, in the technique disclosed in PTL 1, the moving image of the subject displayed on the display apparatus is synchronized with the generated image, but the moving image or the like displayed on the display apparatus has no relation to a real target which is not displayed on the display apparatus. For this reason, there is a demand for improving a user's convenience or usability by associating the moving image displayed on the display apparatus with the real target. There is a demand for easily creating a moving image in which the moving image displayed on the display apparatus is associated with the real target.

Solution to Problem

An advantage of some aspects of the invention is to solve at least a part of the problems described above and the invention can be implemented as the following forms.

(1) An aspect of the invention provides an image processing apparatus. The image processing apparatus includes an external scenery sensor that images at least one target; and an image generation unit that generates a virtual image corresponding to at least one of the targets which are moving among the imaged targets. According to the image processing apparatus of this aspect, since the image generation unit generates a virtual image corresponding to a moving target, a user can easily create, for example, a moving image including a virtual image for supporting work, and thus a user's usability is improved.

(2) In the image processing apparatus of another aspect, the image generation unit may correlate a movement region of an image generation target which is the target of which the virtual image is generated with at least one of the targets excluding the image generation target among the imaged targets, so as to generate the virtual image of the image generation target. According to the image processing apparatus of this aspect, in a case where a moving image including a generated virtual image is reproduced, the virtual image is displayed in correlation with a position, a size, or the like of a target which is really present, correlated with the virtual image. For example, in a case where a moving image is a moving image for supporting work or the like, a user's workability is further improved by overlapping a target on which the work is performed with the virtual image, and thus a user's usability is improved.

(3) In the image processing apparatus of another aspect, the image generation unit may generate the virtual image in which at least one of a size of the virtual image and the movement region is correlated with a size of the target correlated with the movement region of the image generation target. According to the image processing apparatus of this aspect, in a case where a moving image including a generated virtual image is reproduced, the virtual image is displayed in correlation with a position, a size, or the like of a target which is really present, correlated with the virtual image, and thus a user's usability is further improved.

(4) In the image processing apparatus of another aspect, the image generation unit may determine whether or not the virtual image is displayed in correlation with whether or not a set trigger target is detected. According to the image processing apparatus of this aspect, since a virtual image is created so as to be displayed by detecting a specific condition which is set in advance, it is possible to set a display timing corresponding to usage of the virtual image.

(5) In the image processing apparatus of another aspect, the image generation unit may set, as trigger targets, a moving target as the target which is moving, and an associated still target as the target which is determined as being located within a predetermined distance from the moving target and is not moving, among the plurality of imaged targets, and may generate a virtual image in which a moving target correlated image as a virtual image of the moving target is combined with an associated still target image as a virtual image of the associated still target in correlation with combinations of the presence or absence of the moving target and the presence or absence of the associated still target. According to the image processing apparatus of this aspect, a plurality of virtual moving images including a virtual image associated with a moving target are created even if a certain particular operation is not performed, and thus usability of the image processing apparatus is improved.

(6) The image processing apparatus of another aspect may further include an operation reception unit that receives an operation. Here, the image generation unit may erase an unnecessary portion so as to generate the virtual image on the basis of the received operation. According to the image processing apparatus of this aspect, since a moving object which is not required to be generated as a virtual image or a still object which is required to be generated as a virtual image is selected, it is possible to create an AR scenario or a composite scenario which the user can more easily use, and thus a user's usability is improved.

(7) In the image processing apparatus of another aspect, the image generation unit may generate, as the virtual image, a corresponding image while the target is moving, among the plurality of imaged targets. According to the image processing apparatus of this aspect, even if an operation for selecting a target whose virtual image is generated is not performed, a virtual image of a moving object is automatically generated. Therefore, for example, in a case where a moving image including a virtual image is a moving image for supporting work or the like, and a certain target is required to be moved in this work, a virtual image of a moving object which is to be moved is automatically generated, and thus a user's usability is improved.

(8) The image processing apparatus of another aspect may further include a target selection unit. The target selection unit may identify a shape of the human body from shapes other than the human body as at least one target, and the image generation unit may not generate the virtual image corresponding to the shape of the human body among the imaged targets. According to the image processing apparatus of this aspect, in a case where a moving image including a virtual image is being executed, since the human hand or the like which is means for moving an object to be moved is not displayed as a virtual image, a user does not visually recognize an unnecessary virtual image of the hand or the like, and thus a user's convenience is improved.

(9) The image processing apparatus of another aspect may further include a sound acquisition unit that acquires external sound, and the image generation unit may correlate an image generation target which is the target of which the virtual image is generated with sound acquired while the image generation target is moving, so as to generate the virtual image. According to the image processing apparatus of this aspect, a moving image including a created virtual image includes not only visual information such as a virtual image which is generated on the basis of a captured image but also a virtual image which is also correlated with audible information such as sound, and thus a user's convenience is improved.

(10) In the image processing apparatus of another aspect, the image generation unit may generate the acquired sound as a text image in correlation with the virtual image. According to the image processing apparatus of this aspect, since sound can be generated as visual information in parallel to a virtual image, a user can easily recognize the information, and a user's convenience is further improved.

(11) The image processing apparatus of another aspect may further include a distance measurement unit that measures a distance to the target, and the image generation unit may generate the virtual image on the basis of the measured distance. According to the image processing apparatus of this aspect, since a created virtual image can be generated as a three-dimensional model, a user can more easily recognize the virtual image, and a user's convenience is further improved.

(12) In the image processing apparatus of another aspect, in a case where the virtual image is a virtual moving image which changes over time, the image generation unit may insert a specific image into the virtual moving image at a specific time point of the virtual moving image. According to the image processing apparatus of this aspect, a user can recognize an action performed at a specific time point as visual information via a specific image, and thus a user's usability is improved.

(13) The image processing apparatus of another aspect may further include a sound acquisition unit that acquires external sound, and, in a case where the virtual image is a virtual moving image which changes over time, the image generation unit may generate the virtual moving image by correlating a specific time point of the virtual moving image with the acquired sound. According to the image processing apparatus of this aspect, since a user can recognize a specific time point in sound, a specific image does not overlap a virtual image when compared with a case where the specific image is displayed, and thus a user's usability at the specific time point is further improved.

All of the plurality of constituent elements in the respective aspects of the invention described above are not essential, and some of the plurality of constituent elements may be changed, deleted, exchanged with other new constituent elements, and partially deleted from limited content thereof, as appropriate, in order to solve some or all of the above-described problems or in order to achieve some or all of the effects described in the present specification. In addition, in order to solve some or all of the above-described problems or in order to achieve some or all of the effects described in the present specification, some or all of the technical features included in one aspect of the invention described above may be combined with some or all of the technical features included in another aspect of the invention described above, and as a result may be treated as an independent aspect of the invention.

For example, one aspect of the invention may be implemented as an apparatus which includes one or two of the two constituent elements including the external scenery sensor and the image generation unit. In other words, this apparatus may or may not include the external scenery sensor. The apparatus may or may not include the image generation unit. The external scenery sensor may image at least one target. The image generation unit may generate a virtual image corresponding to at least one of the targets which are moving among the imaged targets. The apparatus may be implemented as, for example, an image processing apparatus, but may be implemented as other apparatuses other than the image processing apparatus. According to such an aspect, it is possible to achieve at least one of advantages such as improvement and simplification of operability of the apparatus, integration of the apparatus, and improvement in convenience for a user using the apparatus. Some or all of the above-described technical features of each aspect of the image processing apparatus are applicable to the apparatus.

The invention may be embodied in various aspects other than the image processing apparatus. For example, the invention may be implemented as a computer program for implementing a control method for an image processing apparatus, a system including the image processing apparatus, a control method and system for the image processing apparatus, a recording medium recording the computer program thereon, and data signals which include the computer program and are embodied in carrier waves.

BRIEF DESCRIPTION OF DRAWINGS

FIG. 1 is a functional block diagram illustrating a configuration of an image processing apparatus according to a first embodiment of the invention.

FIG. 2 is a diagram illustrating a case where external scenery including a subject is imaged by an RGB camera and a distance sensor.

FIG. 3 is a flowchart illustrating an AR scenario creation process.

FIG. 4 is a flowchart illustrating the AR scenario creation process.

FIG. 5 is a diagram illustrating a captured image obtained before work in a state in which there is no subject.

FIG. 6 is a diagram illustrating a captured image of external scenery including a tracked moving object.

FIG. 7 is a diagram illustrating an image in which additional information is added to a captured image at a specific time point included in an AR scenario.

FIG. 8 is a diagram illustrating an image obtained by erasing an unnecessary object from the captured image.

FIG. 9 is a diagram illustrating a generated AR image and an object correlated with the AR image.

FIG. 10 is a flowchart illustrating a composite scenario creation process.

FIG. 11 is a diagram illustrating an editing image displayed when a trigger is set.

FIG. 12 is a diagram illustrating an image displayed when division into a division scenario occurs in a case where a trigger is detected.

FIG. 13 is a diagram illustrating an exterior configuration of a head mounted display (HMD).

FIG. 14 is a flowchart illustrating a composite scenario execution process.

FIG. 15 is a diagram illustrating a visual field recognized by a user when a correlated object set in an executed composite scenario is detected.

FIG. 16 is a diagram illustrating a visual field recognized by a user when a trigger target set in an executed division scenario is detected.

FIG. 17 is a functional block diagram illustrating a configuration of an image processing apparatus according to a second embodiment.

FIG. 18 is a flowchart illustrating a part of an AR scenario creation process in the second embodiment.

FIG. 19 is a functional block diagram illustrating a configuration of an image processing apparatus according to a third embodiment.

FIG. 20 is a flowchart illustrating a part of an AR scenario creation process in the third embodiment.

FIG. 21 is a flowchart illustrating an AR scenario creation process in a fourth embodiment.

FIG. 22 is a flowchart illustrating the AR scenario creation process in the fourth embodiment.

FIG. 23 is a diagram illustrating a case where external scenery including a plurality of subjects is imaged by an RGB camera and a distance sensor in the fourth embodiment.

FIG. 24 is a diagram illustrating a case where external scenery including a plurality of subjects is imaged by the RGB camera and the distance sensor in the fourth embodiment.

FIG. 25 is a diagram illustrating a case where external scenery including a plurality of subjects is imaged by the RGB camera and the distance sensor in the fourth embodiment.

FIG. 26 is a diagram illustrating a case where external scenery including a plurality of subjects is imaged by the RGB camera and the distance sensor in the fourth embodiment.

FIG. 27 is a diagram illustrating a case where external scenery including a plurality of subjects is imaged by the RGB camera and the distance sensor in the fourth embodiment.

FIG. 28 is a list illustrating examples of combinations between combinations of trigger targets and AR scenarios, created in a process in step S95 of the AR scenario creation process in the fourth embodiment.

FIG. 29 is a flowchart illustrating a display image determination process in a case where an AR scenario is being executed.

FIG. 30 is a diagram illustrating an example of a visual field recognized by the user when a display image correlated with a combination (1) is displayed on optical image display unit.

FIG. 31 is a diagram illustrating an example of a visual field recognized by the user when a display image correlated with a combination (2) is displayed on the optical image display unit.

FIG. 32 is a diagram illustrating an example of a visual field recognized by the user when a display image correlated with a combination (3) is displayed on the optical image display unit.

FIG. 33 is a diagram illustrating an example of a visual field recognized by the user when a display image correlated with a combination (4) is displayed on the optical image display unit.

DESCRIPTION OF EMBODIMENTS

The term "external scenery sensor" in the present specification includes at least one of an RGB camera and a distance sensor described below. Therefore, the RGB camera, the distance sensor, and a combination thereof are all examples of the "external scenery sensor". Of course, the "external scenery sensor" is not limited to the RGB camera, the distance sensor, or a combination thereof described in the embodiments, and refers to a device which acquires and outputs information for estimating two-dimensional coordinates or three-dimensional coordinates of external scenery or a target (this may also be referred to as a real environment or a real object) included in the external scenery.

The term "target selection unit" refers to a configuration having a function of selecting a real object for which a corresponding virtual image (AR image) is to be shown or a function of providing information which is to be a basis of the selection. In the embodiments, each of object tracking portions 12a, 12b and 12c is an example of the "target selection unit".

A. First Embodiment

A-1. Configuration of Image Processing Apparatus

FIG. 1 is a functional block diagram illustrating a configuration of an image processing apparatus 100 according to a first embodiment of the invention. The image processing apparatus 100 generates a three-dimensional model of a subject which is imaged consecutively, and generates an augmented reality (AR) image on the basis of the generated three-dimensional model and received various operations. The AR image mentioned in the present embodiment indicates an image displayed in accordance with a real target object which is recognized through image recognition or the like.

The image processing apparatus 100 includes a CPU 10, a data storage unit 50, a power supply 60, an RGB camera 31, a distance sensor 32, a microphone 33, an operation unit 34, a display unit 35, a ROM 41, and a RAM 42. The data storage unit 50 stores various data items, and is constituted of a hard disk drive or the like. The power supply 60 supplies power to each unit of the image processing apparatus 100. As the power supply 60, for example, a secondary battery may be used.

The RGB camera 31 is a camera which images external scenery in a predetermined region including a subject. In the present embodiment, the RGB camera 31 is constituted of three cameras disposed at different positions, that is, a first camera 311, a second camera 312, and a third camera 313. The RGB camera 31 transmits RGB data regarding the imaged external scenery to a sensor control unit 15 of the CPU 10 which will be described later. The distance sensor 32 is a depth sensor which images innumerable irradiated points with an infrared camera, so as to measure a distance to an irradiated target. In the present embodiment, the distance sensor 32 is provided in plurality, and is disposed near each camera so as to correspond to the first camera 311, the second camera 312, and the third camera 313. In other words, in the same as the RGB camera 31, the distance sensor 32 is constituted of three depth sensors which are disposed at different positions (a first distance sensor 321, a second distance sensor 322, and a third distance sensor 323). The distance sensor 32 captures an image by using the infrared camera, and transmits data regarding innumerable points of infrared reflected light which is reflected from a surface of an object, to the sensor control unit 15 of the CPU 10. In other embodiments, the distance sensor 32 may measure a distance to the target by using a Time-of-Flight (TOF) method. In the present embodiment, the RGB camera 31 and the distance sensor 32 may be respectively constituted of three cameras 311, 312 and 313 and the three sensors 321, 322 and 323, but may be constituted of cameras and sensors of the number less than three or cameras and sensors of the number more than three. The number of the RGB camera 31 and the number of distance sensor 32 are not necessarily the same as each other, and are not required to have a one-to-one relationship. The RGB camera 31 and the cameras 311, 312 and 313 correspond to an external scenery sensor in the appended claims. However, in a case where the RGB camera 31 and the distance sensor 32 have a one-to-one relationship, not only capturing an image of external scenery or a real object with the RGB camera 31 and the distance sensor 32 but also measuring a distance D from the distance sensor 32 to the real object may also be referred to as "capturing an image". In this case, a captured image is represented by RGBD data. The RGBD data is, for example, data having values of R, G and B, and the distance D for each pixel.

FIG. 2 is a diagram illustrating a case where external scenery SC including a subject OB is imaged by the RGB camera 31 and the distance sensor 32. As illustrated in FIG. 2, three cameras 331, 332 and 333 disposed at different positions capture an image of the external scenery including the subject OB. An image captured by the camera 331 corresponds to a captured image obtained by the first camera 311 and the first distance sensor 321, an image captured by the camera 332 corresponds to a captured image obtained by the second camera 312 and the second distance sensor 322, and an image captured by the camera 333 corresponds to a captured image obtained by the third camera 313 and the third distance sensor 323. As illustrated in FIG. 2, a state is imaged in which the right hand of a cook as the subject OB holds a scale remover TL, the left hand of the subject OB presses a head of a fish FS, and the cook removes scales of the fish FS with the scale remover TL. Positions or colors of the targets included in the external scenery SC, such as the subject OB, the scale remover TL, and the fish FS, are specified on the basis of RGB data and distance data acquired by the cameras 331, 332 and 333 disposed at the different positions.

As a method of specifying a position of the camera or the sensor, other aspects may be employed. As a method of obtaining a three-dimensional position of a real object in the external scenery SC, for example, in a case where a positional relationship of the cameras 331, 332 and 333 and camera parameters are known, and a horizontal axis of the distance sensor 32 is parallel to a ground surface, a light source which intermittently emits light (for example, infrared light) is provided in a common imaging region of the cameras 331, 332 and 333. The respective cameras 331, 332 and 333 capture images of the light source (the images are represented by RGBD data for each pixel; the distance D is a distance from the distance sensor 32), and thus a three-dimensional position $(X_i, Y_i, Z_i)$ (where i=0, 1, and 2) of the light source viewed from the respective cameras 331, 332 and 333 is estimated. For example, two coordinates of the common light source viewed from the cameras 332 and 333 (i=1 and 2) are converted into a coordinate viewed from the camera 331 (i=0). At this time, a conversion matrix which matches a coordinate converted from the coordinates viewed from the cameras 332 and 333 with the coordinate viewed from the camera 331 is derived for each of the cameras 332 and 333. Specifically, a conversion matrix which causes a difference between the coordinate of the camera 331 and the converted coordinate to be the minimum is calculated through iterative computation. Through this setting, respective three-dimensional models generated from respective viewpoints of the cameras 331, 332 and 333 are merged with each other, and thus a single three-dimensional model which is not dependent on the viewpoints of the cameras can be generated. The cameras 331, 332 and 333 may capture images by changing the position of the provided light source, so that accuracy is increased. The number of sets of RGB camera 31 and the distance sensor 32 may be four or more.

The microphone 33 (FIG. 1) acquires external sound while the RGB camera 31 and the distance sensor 32 are imaging a predetermined region or when an operation is received from a user. The microphone 33 transmits an audio signal based on the acquired sound to a UI control unit 16 of the CPU 10 which will be described later. The operation unit 34 is a user interface (UI) which receives an input operation from the user. The operation unit 34 is constituted of a keyboard or a mouse. The operation unit 34 transmits a control signal corresponding to a pressed key of the keyboard, or a control signal based on a change of a position of a pointer of the mouse, to the UI control unit 16 of the CPU 10. The display unit 35 is a liquid crystal panel which displays an image on the basis of an image signal transmitted from the UI control unit 16. The user can operate the image processing apparatus 100 by operating the operation unit 34 or the microphone 33 while viewing the image displayed on the display unit 35. The operation unit 34 and the microphone 33 correspond to an operation reception unit in the appended claims, and the microphone 33 corresponds to a sound acquisition unit.

The CPU 10 reads a computer program stored in the ROM 41, and develops and executes the computer program on the RAM 42 so as to control the image processing apparatus 100. The CPU 10 includes an AR scenario control unit 11, an object tracking unit 12, an object recognition unit 13, a three-dimensional model generation unit 14 (a 3D model generation unit 14), the sensor control unit 15, the user interface control unit 16 (the UI control unit 16), an AR scenario operation setting unit 17, an additional information acquisition unit 18, an unnecessary image erasure unit 19, and an AR image extraction unit 21.

The sensor control unit 15 acquires the RGB data regarding the external scenery transmitted from the RGB camera 31, and data regarding the innumerable points imaged by the infrared camera, transmitted from the distance sensor 32. The sensor control unit 15 transmits the data acquired from the RGB camera 31 and the distance sensor 32, to the object tracking unit 12 and the 3D model generation unit 14, respectively. The sensor control unit 15 controls the RGB camera 31 and the distance sensor 32 on the basis of a control signal transmitted from the UI control unit 16.

The 3D model generation unit 14 creates a three-dimensional model (3D model) of a target which is present in the imaged predetermined region by using the RGB data obtained by the RGB camera 31 and the distance data obtained by the distance sensor 32, transmitted from the sensor control unit 15, on the basis of a control signal transmitted from the AR scenario control unit 11. As a specific example of a method of creating a three-dimensional model, the 3D model generation unit 14 acquires a shape of an object in the imaging region on the basis of the distance data acquired by the distance sensor 32, and detects the same boundary in the acquired shape of the object on the basis of the acquired distance data, so as to generate a three-dimensional model. The 3D model generation unit 14 colors the generated three-dimensional model on the basis of the RGB data transmitted from the RGB camera 31. The 3D model generation unit 14 transmits the generated and colored three-dimensional model and data regarding the detected same boundary to the object recognition unit 13.

The object recognition unit 13 recognizes a three-dimensional model which has data regarding a consecutive boundary as a single object by using the generated three-dimensional model and the data regarding the detected same boundary on the basis of a control signal transmitted from the AR scenario control unit 11. In other words, the object recognition unit 13 separates the three-dimensional models so as to recognize as respective objects on the basis of data regarding a nonconsecutive boundary. The object recognition unit 13 compares the three-dimensional model with parts of the human body (for example, the hand or the foot) stored in the data storage unit 50 which will be described later via the AR scenario control unit 11 by using a pattern matching method or a statistical identification method, so as to extract the human body from the three-dimensional model. The distance sensor 32 and the sensors 321, 322 and 323 correspond to a distance measurement unit.

The object tracking unit 12 specifies a motion of a moving object during imaging for each of recognized objects on the basis of a control signal transmitted from the AR scenario control unit 11. The object tracking unit 12 transmits information for specifying an object (moving object) which is moving and an object (still object) which does not move, to the UI control unit 16 and the AR scenario control unit 11.

The UI control unit 16 transmits control signals to respective constituent elements of the display unit 35 or the CPU 10 on the basis of an operation received by the microphone 33 or the operation unit 34. For example, the UI control unit 16 transmits a signal for controlling the RGB camera 31 and the distance sensor 32 to the sensor control unit 15 on the basis of an operation received by the operation unit 34. The UI control unit 16 transmits image signals for displaying each object on the display unit 35 so that the user can select and operate each of the specified objects transmitted from the object tracking unit 12. The UI control unit 16 includes a text conversion portion 161 which automatically converts sound acquired by the microphone 33 into a text image when an AR scenario is created as will be described later. The text conversion portion 161 converts acquired sound into a corresponding text image through sound recognition.

The AR scenario operation setting unit 17 sets a situation which is operated by an AR scenario created by the image processing apparatus 100. In the present embodiment, the AR scenario indicates a moving image including an AR image corresponding to at least one moving object, and the AR scenario includes sound, a text image, or the like inserted by the user. The AR scenario operation setting unit 17 sets the AR scenario to be executed, for example, in a case where a target object correlated with a generated AR image is detected as a real target through image recognition or the like. The AR scenario operation setting unit 17 sets division into a plurality of AR scenarios when a specific real object which is set in advance is detected.

The additional information acquisition unit 18 acquires information which will be added to the AR scenario on the basis of an operation signal received by the UI, transmitted from the UI control unit 16, or a control signal transmitted from the AR scenario control unit 11. As the information added to the AR scenario, there is, for example, information regarding setting of a display method of enlarging or reducing a AR image set by an operation received by the operation unit 34 and displaying the AR image, or text information which is converted from sound acquired by the microphone 33 and is inserted into the AR scenario.

The AR scenario control unit 11 controls each unit of the CPU 10 in order to create an AR scenario. The AR scenario control unit 11 discriminates objects into an object which is to be generated as an AR image and an image which is not to be generated as an AR image on the basis of the moving object and the still object specified by the object tracking unit 12, and an operation received by the UI, and transmits a discrimination result to the unnecessary image erasure unit 19 and the AR image extraction unit 21. The AR scenario control unit 11 transmits and receives various data items to and from the data storage unit 50 so as to read and edit a previously created AR scenario or to store a newly created AR scenario in the data storage unit 50.

The unnecessary image erasure unit 19 erases an image of an object which is not to be generated as an AR image among the specified objects on the basis of control signals transmitted from the AR scenario control unit 11 and the AR scenario operation setting unit 17. In other words, it can be said that the unnecessary image erasure unit 19 selects an object to be generated as an AR image, from a captured image. The unnecessary image erasure unit 19 transmits an image signal for an image erased as an unnecessary object to the AR scenario control unit 11.

The AR image extraction unit 21 extracts an object to be displayed in the AR scenario as an AR image on the basis of a control signal transmitted from the AR scenario control unit 11, so as to generate an image thereof. The AR image extraction unit 21 generates the AR image as a three-dimensional image on the basis of the distance data acquired by the distance sensor 32. The AR image extraction unit 21 colors the generated AR image on the basis of the RGB data acquired by the RGB camera 31. The AR image extraction unit 21 transmits a signal for specifying the object generated as the extracted AR image, to the AR scenario control unit 11. In addition, the AR image extraction unit 21 receives a predetermined operation via the operation unit 34, so as to automatically extract a specific object stored in the data storage unit 50 as an object to be generated as an AR image. The specific object may be extracted by the AR image extraction unit 21 referring to a drawing which is created by using computer aided design (CAD). The AR image extraction unit 21 corresponds to an image generation unit in the appended claims.

A-2. AR Scenario Creation Process

FIGS. 3 and 4 are flowcharts illustrating an AR scenario creation process. The AR scenario creation process is a process in which the image processing apparatus 100 creates an AR image of a moving object or the like included in an external scenery image captured by the RGB camera 31 and the distance sensor 32.

In the AR scenario creation process, first, the microphone 33 or the operation unit 34 waits for an operation for starting creation of an AR scenario to be received (step S12). If the microphone 33 receives predetermined sound which is set in advance, the image processing apparatus 100 starts the AR scenario creation process. Instead, if the operation unit 34 receives an operation on a predetermined button of the keyboard which is set in advance, the image processing apparatus 100 may start the AR scenario creation process. In the process in step S12, if the microphone 33 or the operation unit 34 does not receive an operation for starting the AR scenario creation process (NO in step S12), the microphone 33 or the operation unit 34 continues to wait for the operation for starting the AR scenario creation process to be received (step S12).

If the operation for starting the AR scenario creation process is received (YES in step S12), the AR scenario control unit 11 sets an imaging region imaged by the RGB camera 31 and the distance sensor 32 (step S14). The AR scenario control unit 11 sets the imaging region or a position thereof when the operation unit 34 receives a predetermined operation. In the present embodiment, an imaging region of the RGB camera 31 and an imaging region of the distance sensor 32 are set as the same region, but, in other embodiments, an imaging region of the RGB camera 31 and an imaging region of the distance sensor 32 may be separately set.

If the imaging region of the RGB camera 31 and the distance sensor 32 is set, the RGB camera 31 acquires RGB data regarding the imaging region, and the distance sensor 32 measures a distance from the distance sensor 32 to an object which is present in the imaging region (step S16). The RGB camera 31 transmits the acquired RGB data regarding the imaging region to the 3D model generation unit 14 and the object tracking unit 12 via the sensor control unit 15. The distance sensor 32 transmits data regarding the measured distance to the object present in the imaging region to the 3D model generation unit 14 and the object tracking unit 12 via the sensor control unit 15.

The 3D model generation unit 14 generates a three-dimensional model (3D model) on the basis of the RGB data transmitted from the RGB camera 31 and the distance data transmitted from the distance sensor 32 (step S18). The 3D model generation unit 14 generates a three-dimensional model(s) of a shape of the object included in the imaging region on the basis of the distance data. The 3D model generation unit 14 colors the generated three-dimensional models on the basis of the RGB data. In the present embodiment, each of the three-dimensional models generated by the 3D model generation unit 14 is obtained by merging three-dimensional models generated from respective viewpoints of the cameras 331, 332 and 333 into a single model. The object recognition unit 13 recognizes individual objects included in the generated three-dimensional models by using detected identical boundary data (step S20).

FIG. 5 is a diagram illustrating a captured image obtained before work in a state in which there is no subject OB. If the imaging region is set, the RGB camera 31 and the distance sensor 32 start to image the external scenery SC. Since there is no subject OB in the imaging region right after the imaging is started, as illustrated in FIG. 5, the subject OB which is a cook is not included in the captured image. In the present embodiment, three-dimensional models of each of the fish FS and the scale remover TL are created in a state in which there is no subject OB right after the imaging is started. As will be described later in detail, the generated three-dimensional model of the scale remover TL is associated with a motion of the scale remover TL specified by the object tracking unit 12, and is used as some images forming an AR scenario.

If the process in step S20 of FIG. 3 is performed, the microphone 33 or the operation unit 34 waits for an operation indicating that an initial setting prior to starting of capturing a moving image is completed, to be received (step S21). If the operation indicating that the initial operation is completed is not received, the CPU 10 performs the processes in step S14 and the subsequent steps again. If the operation indicating that the initial operation is completed is received in the process in step S21 (YES in step S21), then, the microphone 33 or the operation unit 34 waits for an operation for starting imaging of a moving object to be received (step S22). If the microphone 33 or the operation unit 34 does not receive the operation for starting imaging (NO in step S22), the microphone 33 or the operation unit 34 waits for the operation for starting imaging to be received (step S22). If the operation for starting imaging is received in the process in step S22 (YES in step S22), the RGB camera 31 and the distance sensor 32 capture a moving image of the set imaging region over time (step S22). The object tracking unit 12 discriminates objects which are included in the imaging region and are generated as three-dimensional models into a moving object(s) and still objects, and tracks the moving objects (step S24). The object tracking unit 12 measures a change amount of RGB data regarding the discriminated moving object and a change amount of the measured distance so as to specify changes in positions such as a trajectory or a pose of the moving object.

FIG. 6 is a diagram illustrating a captured image of the external scenery SC including a tracked moving object. FIG. 6 illustrates the external scenery SC imaged by the RGB camera 31 and the distance sensor 32 in a case where the same region as the imaging region in FIG. 2 is set. The external scenery SC in FIG. 6 is different from the external scenery SC in FIG. 2 in that a position of the scale remover TL held by the subject OB which is a cook is close to the head of the fish FS pressed by the left hand of the subject OB. For this reason, the object tracking unit 12 tracks the scale remover TL and the right hand of the subject OB holding the scale remover TL as moving objects, and discriminates the left hand of the subject OB, the fish FS, and the like as still objects. FIG. 6 illustrates a captured image obtained by the cameras 331, 332 and 333, and thus the cameras 331, 332 and 333 are not included in the captured image. In the present embodiment, the right hand of the subject OB and the scale remover TL are tracked as moving objects, but, in other embodiments, scales removed from the fish FS by moving the scale remover TL may be tracked as moving objects.

The AR scenario control unit 11 sets at least one of the tracked moving object and a still object which contacts the tracked moving object in AR scenario data as a trigger(s) for executing the AR scenario in a case where the created AR scenario is executed. If a trigger for executing an AR scenario is set, and the trigger is detected in an image captured by a camera provided in a head mounted display (HMD) which can perform AR display, the AR scenario in which the trigger is set is automatically executed. It is noted that the AR scenario control unit 11 is not necessarily required to set a trigger in an AR scenario.

Next, the additional information acquisition unit 18 acquires additional information which is added to the created AR scenario on the basis of an operation received by the microphone 33 or the operation unit 34 (step S26). As the additional information, there is, for example, a text image into which sound acquired by the microphone 33 is converted by the text conversion portion 161 while the RGB camera 31 and the distance sensor 32 are imaging the imaging region including the moving object. As another example of the additional information, in a case where an AR scenario created by another information processing apparatus is used, a kitchen knife as an object (non-recommended object) which is not desired to be detected may be set in contrast to the scale remover TL as an object (recommended object) which is desired to be detected. In this case, if the kitchen knife as a non-recommended object is detected when the AR scenario is being executed, the AR scenario may be stopped or may change to another AR scenario. Details of execution of an AR scenario will be described later in "A-4. Execution of Composite Scenario".

FIG. 7 is a diagram illustrating an image in which additional information is added to a captured image at a specific time point included in an AR scenario. FIG. 7 illustrates an image in which sound acquired by the microphone 33 is added to the captured image illustrated in FIG. 6 acquired by the RGB camera 31 and the distance sensor 32 in a form of a text image TX1 as additional information. When the operation unit 34 receives a user's operation, a font size or a color of the text image TX1 may be changed, or a position at which the text image TX1 is added to the captured image may be changed.

If the additional information is acquired (step S26 of FIG. 3), in order for the AR scenario control unit 11 to determine of which object an AR image is created, the operation unit 34 receives an operation for selecting to or not to automatically erase an unnecessary image of an object which is not an AR image creation target (step S28). The AR scenario control unit 11 displays a selection screen for selecting to automatically or manually erase the unnecessary image on the display unit 35, and determines a process of the erasure of the unnecessary image on the basis of an operation received by the operation unit 34. If an operation for selecting that the unnecessary image is automatically erased is received in the process in step S28 (YES in step S28), the unnecessary image erasure unit 19 erases still objects and the human body among moving objects as an unnecessary object which is not an AR image generation target (step S38). In other words, the unnecessary image erasure unit 19 does not erase objects excluding the human body among moving objects as AR image generation targets. The unnecessary image erasure unit 19 erases human parts extracted by the object recognition unit 13 from the captured image. The objects erased from the captured image are not displayed as AR images in the created AR scenario. In the present embodiment, even the same object is referred to as a moving object while the object is moving, and is referred to as a still object while the object stops. In other embodiments, a moving object and a still object may be defined for each object.

FIG. 8 is a diagram illustrating an image in which the unnecessary objects are removed from the captured image. A moving object which is not erased as an unnecessary object is only the scale remover TL, but, in FIG. 8, for explanation, the fish FS (dashed line) and the subject OB (one-dot chain line) which have been erased as unnecessary objects are also illustrated. From the captured image, the unnecessary image erasure unit 19 erases the fish FS or the like as a still object included in the external scenery SC, and also erases the subject OB which is a cook determined as being the human body regardless of whether the subject is moving or rests. In the present embodiment, the fish FS is described as a still object, but determination of stopping (being static) or moving may be performed on the basis of the magnitude of a movement amount. For example, in a case where the subject OB lifts the tail of the fish FS, the fish FS may be determined as being a still object even if the fish FS is moved, on the basis of the magnitude of a movement amount, a movement speed, or the like.

If the unnecessary objects are erased from the image (step S38 of FIG. 4), the AR image extraction unit 21 extracts objects other than the unnecessary objects, selected as AR image generation targets by the unnecessary image erasure unit 19, and generates an AR image in which the extracted object is correlated with an object (hereinafter, referred to as a contact object) which contacts the extracted object (step S34). As an example of the correlation between the extracted object and the contact object, a movement region of the extracted object or a size of the extracted object may be correlated with a size or an orientation of the contact object and a movement region of the contact object. If a movement region, a size, or the like of an AR image generation target object is correlated with a movement region, a size, or the like of an object present within a predetermined distance from the target object, in a case where a created AR scenario is executed and a contact object correlated with an AR image is detected, then the AR image is generated on the basis of the contact object and displayed, the AR image being correlated with a position, a shape, and a size of the detected contact object. The AR image extraction unit 21 may correlate sound acquired by the microphone 33 with an AR image as additional information while a moving object generated as the AR image is moving during imaging. As a method of correlating sound as additional information with an AR image, for example, there is a method in which sound correlated with a moving object is displayed as a text image only while an AR image of the moving object is being displayed. An AR image generation target corresponds to an image generation target in the appended claims.

FIG. 9 is a diagram illustrating a generated AR image and an object correlated with the AR image. FIG. 9 illustrates an image AR1 (solid line) of the scale remover TL generated as an AR image, and the fish FS (dashed line) correlated with the image AR1. In a case where an AR scenario including the image AR1 is being executed, if an apparatus which executes the AR scenario detects the fish FS, the image AR1 of the scale remover TL is displayed in correlation with a position of the detected fish FS. Details of detection of the fish FS or display of the image AR1 in a case where the AR scenario is being executed by the apparatus will be described later in "A-4. Execution of Composite Scenario".

If the AR image is generated (step S34 of FIG. 4), the AR scenario control unit 11 creates a moving image as the AR scenario on the basis of the AR image and the additional information, and preserves the created AR scenario data in the data storage unit 50 (step S36), and the image processing apparatus 100 finishes the AR scenario creation process.

In the process in step S28, if an operation for selecting an unnecessary object not automatically but manually (NO in step S28), the AR scenario control unit 11 displays a selection image for selecting each of a moving object and a still object included in the imaging region on the display unit 35 (step S30). The unnecessary image erasure unit 19 erases a moving object or a still object selected as an unnecessary object to be erased from the captured image acquired by the RGB camera 31 and the distance sensor 32 on the basis of an operation received by the operation unit 34. In a case where an object which is to be erased manually is selected from the captured image, the user can select any AR image generation target when compared with the case where a still object or human parts are automatically erased from the captured image. For example, in addition to the AR image of the scale remover TL, an AR image of the right hand of the subject OB holding the scale remover TL or an AR image of the fish FS may be generated. In other embodiments, an aspect may be employed in which not an object to be erased but an AR image generation target is selected. If the unnecessary object is erased through the user's operation (step S32), the AR image extraction unit 21 and the AR scenario control unit 11 perform the processes in step S34 and the subsequent steps.

A-3. Composite Scenario Creation Process

FIG. 10 is a flowchart illustrating a composite scenario creation process. The composite scenario creation process is a process in which the CPU 10 creates a composite scenario in which a plurality of AR scenarios are combined with each other. The AR scenario operation setting unit 17 of the CPU 10 creates, as a created composite scenario, a composite scenario in which, for example, when a trigger is detected in a certain AR scenario, division into another AR scenario occurs. As the trigger, there is, for example, detection of a specific object in the imaging region, or an operation received by the microphone 33 or the operation unit 34.

In the composite scenario creation process, first, the microphone 33 or the operation unit 34 waits for an operation for starting creation of a composite scenario to be received (step S42). If the operation for starting creation of a composite scenario is not received (NO in step S42), the AR scenario operation setting unit 17 finishes the composite scenario creation process (step S42).

If the operation for starting creation of a composite scenario is received in the process in step S42 (YES in step S42), the AR scenario operation setting unit 17 selects a screen for selecting a single AR scenario (hereinafter, also referred to as a "basic scenario") serving as a basis of a composite scenario (step S44). In order to cause the user to select the basic scenario, the AR scenario operation setting unit 17 displays a plurality of AR scenarios preserved in the data storage unit 50 on the display unit 35, and allows the user to operate the operation unit 34, so that a single basic scenario is selected from the plurality of AR scenarios. A method of selecting the basic scenario is not limited thereto, and may be variously modified.

Next, the AR scenario operation setting unit 17 sets a trigger for division into other scenarios (hereinafter, referred to as "division scenarios") composed in the basic scenario (step S46). The AR scenario operation setting unit 17 sets the trigger in the basic scenario on the basis of an operation received by the microphone 33 and the operation unit 34. In a case where the trigger is set, the AR image extraction unit 21 displays a preset image on the display unit 35 in order to cause the user to visually recognize that the basic scenario in which the trigger is set is being edited. In other words, in a case where the composite scenario is edited, the AR image extraction unit 21 inserts the preset image into the AR scenario. The division scenario in the present embodiment also includes a new AR scenario which is executed after the entire basic scenario is finished.

FIG. 11 is a diagram illustrating an editing image KC displayed when the trigger is set. FIG. 11 illustrates the editing image KC which is displayed during editing to cause the division into a division scenario in a case where the basic scenario is an AR scenario for prompting removal of scales of the fish FS. In a case where a trigger is set in the basic scenario, the image AR1 which is an AR image of the scale remover TL and the editing image KC are displayed in correlation with a position of the detected fish FS as a real object in the same manner as when the basic scenario is being executed. The editing image KC is an image showing that the basic scenario is an AR scenario of the "scale remover", "8 minutes 37 seconds" have elapsed from the start of the basic scenario, and a state at the present time is a "division editing" state. The editing image KC can be moved or erased on the basis of an operation received by the operation unit 34. The time of editing corresponds to a specific time point in the appended claims, and the editing image KC corresponds to a specific image in the appended claims.

If the trigger is set (step S46 of FIG. 10), the AR scenario operation setting unit 17 sets a division scenario into which division occurs in a case where the set trigger is detected when the basic scenario is being executed (step S48). In order to set the division scenario, the AR scenario operation setting unit 17 displays a plurality of AR scenarios preserved in the data storage unit 50 on the display unit 35, and allows the user to operate the operation unit 34, so that a single division scenario is set from among the plurality of AR scenarios. A method of selecting a division scenario is not limited thereto and may be variously modified.

FIG. 12 is a diagram illustrating an image displayed when division into a division scenario occurs in a case where the trigger is detected. FIG. 12 illustrates a text image TX2 and an image AR2 which is an AR image displayed when division into a division scenario occurs in a case where a kitchen knife KN set as a trigger is detected from the captured images. The text image TX2 is a text image for prompting removal of scales of the fish FS using the scale remover TL, and is additional information which is added so as to be displayed when division into a division scenario occurs. The text image TX2 is set to be displayed in correlation with a display region in which the apparatus executing the AR scenario can display an image. The image AR2 is an AR image showing "X" indicating that the kitchen knife KN detected as the trigger has no relation to removal of scales of the fish FS. The image AR2 is additional information which is set to be displayed in the division scenario in a case where the kitchen knife KN as the trigger is detected. The image AR2 is set to be displayed in correlation with a position of the detected kitchen knife KN.

If the division scenario is set (step S48 of FIG. 10), the microphone 33 or the operation unit 34 receives an operation regarding whether or not another division scenario is further added to the selected basic scenario (step S50). If the operation for adding another division scenario is received (YES in step S50), the AR scenario operation setting unit 17 performs the processes in step S46 and the subsequent steps.

If the operation for adding another division scenario is not received in the process in step S50 (NO in step S50), the AR scenario operation setting unit 17 creates the division scenario set in the selected basic scenario together as a composite scenario, preservers the created composite scenario in the data storage unit 50, and finishes the composite scenario creation process.

A-4. Execution of Composite Scenario

A description will be made of a composite scenario execution process in which the composite scenario created by the image processing apparatus 100 is executed. The composite scenario execution process is a process in which an apparatus that can detect an object in external scenery and can display an AR image on an image display unit executes a specific composite scenario on the basis of a specific object detected in the external scenery. As an apparatus which can execute a composite scenario, there is, for example, an HMD in which an imaging camera detecting an object in external scenery is mounted.

FIG. 13 is a diagram illustrating an exterior configuration of a head mounted display 200 (HMD 200). The HMD 200 is an optical transmission (optical see-through) type head mounted display which allows a user to visually recognize a virtual image and also to directly and visually recognize external scenery. The HMD 200 includes the image display section 80 which enables the user to visually recognize a virtual image in a state of being mounted on the head of the user, and a control section 70 (a controller 70) which controls the image display section 80.

The image display section 80 is a mounting body which is mounted on the head of the user, and has a spectacle shape. The image display section 80 includes a right display driving unit 82, a left display driving unit 84, a right optical image display unit 86, a left optical image display unit 88, a camera 89, a depth sensor 91, and a nine-axis sensor 87. The right optical image display unit 86 and the left optical image display unit 88 are disposed so as to be located in front of the right and left eyes of the user when the user wears the image display section 80. The right display driving unit 82 and the left display driving unit 84 are disposed on a side opposing the head of the user when the user wears the image display section 80.

The display driving units 82 and 84 respectively include liquid crystal displays. The optical image display units 86 and 88 as optical members include light guide plates and dimming plates. The light guide plates are made of a light transmissive resin material or the like and guide image light which is output from the display driving units 82 and 84 to the eyes of the user. The dimming plate is a thin plate-shaped optical element, and is disposed to cover a surface side of the image display section 80 which is an opposite side to the user's eye side.

The camera 89 is disposed at the position corresponding to the glabella of the user when the user wears the image display section 80. The camera 89 captures an image of external scenery which is an external view in a visual line direction of the user in a state in which the user wears the image display section 80 on the head, thereby obtaining a captured image. The depth sensor 91 is a distance sensor which measures a distance to a target object included in an imaging region.

The nine-axis sensor 87 is disposed at a position corresponding to the right temple of the user. The nine-axis sensor 87 is a motion sensor which detects acceleration (in three axes), angular velocity (in three axes), and geomagnetism (in three axes). The nine-axis sensor 87 is provided in the image display section 80 and thus functions as a motion detection unit which detects a motion of the head of the user of the HMD 200 when the image display section 80 is mounted on the user's head. Here, the motion of the head includes velocity, acceleration, angular velocity, a direction, and a change in the direction of the head.

The image display section 80 further includes a connection unit 85 which connects the image display section 80 to the control section 70. A part of the connection unit 85 extends to a right earphone 81 and a left earphone 83. As a cord constituting the connection unit, for example, a metal cable or an optical fiber may be employed. The image display section 80 and the control section 70 perform transmission of various signals via the connection unit 85.

The control section 70 is a device used to control the HMD 200. The control section 70 is an operation section including a plurality of keys, a track pad, or the like. The plurality of keys of the control section 70 detects a pressing operation, and transmits a control signal corresponding to the pressed key to the image display section 80. The track pad of the control section 70 detects an operation of the user's finger on an operation surface of the track pad, and outputs a signal corresponding to the detected content.

The control section 70 includes a CPU 75 (not illustrated) which controls the image display section 80. The CPU 75 executes a composite scenario preserved in the data storage unit 50, received via wireless communication or the like. If the control section 70 receives an operation on a predetermined key, the CPU 75 detects an object (hereinafter, also referred to as a "correlated object") correlated with an AR image included in the basic scenario of the composite scenario from an image captured by the camera 89. The CPU 75 displays the AR image included in the basic scenario on the optical image display units 86 and 88 of the image display section 80 in correlation with a position of the detected correlated object. The CPU 75 detects a trigger target image for causing division from the basic scenario into a division scenario from the image captured by the camera 89. If the trigger target image is detected from the image captured by the camera 89, the CPU 75 causes division from the basic scenario into the division scenario, and displays an AR image based on the division scenario on the optical image display units 86 and 88.

FIG. 14 is a flowchart illustrating the composite scenario execution process. In the composite scenario execution process, first, the control section 70 of the HMD 200 mounted on the user's head determines whether or not an operation for executing the composite scenario process has been received (step S61). If the control section 70 has not received the operation for executing a composite scenario (NO in step S61), the HMD 200 finishes the composite scenario execution process.

If the control section 70 has received the operation for executing a composite scenario in the process in step S61 (YES in step S61), an image for causing the user to select a composite scenario to be executed is displayed on the optical image display units 86 and 88 of the image display section 80 (step S63). The user visually recognizes the image displayed on the optical image display units 86 and 88 and can select a single composite scenario to be executed by operating the keys of the control section 70. If the composite scenario is selected, the CPU 75 of the control section 70 detects a correlated object correlated with an AR image included in a basic scenario of the selected composite scenario from an image captured by the camera 89 (step S65). The CPU 75 detects the correlated object of the AR image by using a pattern matching method or a statistical identification method from the captured image. The CPU 75 measures a distance to the correlated object, measured by the depth sensor 91. In the present embodiment, a single composite scenario is selected, but, in other embodiments, a plurality of composite scenarios may be selected, and a composite scenario to be executed may be determined by a detected correlated object. The number of composite scenarios to be executed or a method of selecting a composite scenario may be variously modified.

If the correlated object is detected from the captured image, the CPU 75 specifies a position of the correlated object in the captured image, and displays an AR image or additional information included in the composite scenario in correlation with the specified position of the correlated object (step S67). In the HMD 200, an imaging region of the camera 89 and positions of pixels displayed on the optical image display units 86 and 88 visually recognized by the user are set to match each other in advance. Thus, if the CPU 75 displays the AR image on the optical image display units 86 and 88 in correlation with the correlated object, the user can visually recognize the AR image correlated with the position of the real correlated object. The CPU 75 may display an AR image in a stereoscopic manner in correlation with a distance to the correlated object, measured by the depth sensor 91 (the stereoscopic display mentioned here is to display two AR images for the left and right eyes with parallax). The CPU 75 does not display an AR image included in the composite scenario in a case where a correlated object is not detected. The additional information includes, for example, not only an image displayed on the optical image display units 86 and 88, such as a text image, but also sound or the like output from the earphones 81 and 83.

FIG. 15 is a diagram illustrating a visual field VR which is recognized by the user in a case where a correlated object set in an executed composite scenario is detected. As illustrated in FIG. 15, the visual field VR recognized by the user includes the external scenery SC which is transmitted through the optical image display units 86 and 88 of the image display section 80 mounted on the head, the image AR1 of the scale remover TL displayed on the optical image display units 86 and 88, and the text image TX1. The external scenery SC includes the fish FS placed on a chopping board. The image AR1 of the scale remover TL and the text image TX1 are displayed on the optical image display units 86 and 88 in correlation with a position of the fish FS which is detected from the captured image by the CPU 75. The image AR1 is not a still image but a moving image which reciprocates between the head and the tail of the fish FS.

If the AR image included in the composite scenario is displayed on the optical image display units 86 and 88 (step S67 of FIG. 14), the CPU 75 monitors detection of a trigger target image for causing division into a division scenario from the image captured by the camera 89 (step S69). If the trigger target image is detected from the captured image (YES in step S69), the CPU 75 performs division into a division scenario correlated with the detected trigger target (step S73). If division occurs from the executed AR scenario into the division scenario, the CPU 75 detects a correlated object correlated with an AR image included in the division scenario (step S65). The CPU 75 specifies a position of the detected correlated object, and displays the AR image included in the division scenario in correlation with the specified position of the correlated object (step S67). The correlated object correlated with the AR image included in the division scenario and the trigger target may be the same object or different objects.

FIG. 16 is a diagram illustrating a visual field VR which is recognized by the user in a case where a trigger target set in an executed division scenario is detected. As illustrated in FIG. 16, the visual field VR recognized by the user includes the external scenery SC which is transmitted through the optical image display units 86 and 88 of the image display section 80 mounted on the head, the image AR2 showing "X" displayed on the optical image display units 86 and 88, and the text image TX2. The external scenery SC includes the fish FS placed on the chopping board, and the kitchen knife KN held with the user's right hand. The text image TX2 is displayed on the optical image display units 86 and 88 in correlation with a position of the fish FS which is detected from the captured image by the CPU 75. The image AR2 is displayed on the optical image display units 86 and 88 in correlation with a position of the kitchen knife KN which is detected from the captured image by the CPU 75.

If a trigger target image is not detected from the captured image in the process in step S69 of FIG. 14 (NO in step S69), the CPU 75 determines whether or not the AR scenario (hereinafter, also referred to as an "executed scenario") which is being executed in the composite scenario is finished (step S71). If an operation for finishing the executed scenario is received by the control section 70, or if it is determined that the executed scenario is not required to be displayed, the CPU 75 finishes the executed scenario. As an example in which the CPU 75 determines that the executed scenario is not required to be displayed, there is a case where it is determined that there is no scale on a surface of the fish FS in the imaging region of the camera 89 when an AR scenario for prompting removal of scales of the fish FS is being executed.

If it is determined in the process in step S71 that the executed scenario is not finished (NO in step S71), the CPU 75 continues to display an AR image and additional information included in the executed scenario on the optical image display units 86 and 88. If it is determined in the process in step S71 that the executed scenario is finished (YES in step S71), the HMD 200 finishes the composite scenario execution process.

As described above, in the image processing apparatus 100 of the present embodiment, the AR image extraction unit 21 generates an AR image of a moving object among respective objects recognized by the object recognition unit 13 and the 3D model generation unit 14. Therefore, in the image processing apparatus 100 of the present embodiment, only by specifying a moving object, an AR image corresponding to the specified object is generated, resulting in that the user can easily create, for example, an AR scenario for work support or assistance, and thus a user's usability is improved.

In the image processing apparatus 100 of the present embodiment, the AR image extraction unit 21 generates an AR image by correlating a movement region of an AR image generation target with an object which is erased by the unnecessary image erasure unit 19. For this reason, in the image processing apparatus 100 of the present embodiment, in a case where an AR scenario including the generated AR image is executed, the AR image is displayed in correlation with a position, a size, or the like of a really present object correlated with the AR image. For example, in a case where an AR scenario is a moving image for work assistance or the like, a user's workability is further improved by overlapping a target on which the work is performed with the AR image, and thus a user's usability is improved.

In the image processing apparatus 100 of the present embodiment, the AR image extraction unit 21 correlates a size or a movement region of an AR image generation target with the size of the target correlated with a generated AR image, so as to generate the AR image. For this reason, in the image processing apparatus 100 of the present embodiment, in a case where an AR scenario including the generated AR image is executed, the AR image is displayed in correlation with a position, a size, or the like of an actually present object correlated with the AR image. Therefore, a user's usability is further improved.

As described above, in the image processing apparatus 100 of the present embodiment, the distance sensor 32 measures a distance to a surface of an imaged target, and the object recognition unit 13 recognizes respective objects included in a captured image by using a three-dimensional model generated by the 3D model generation unit 14. The AR image extraction unit 21 generates an AR image of a moving object which is moving, other than a still object erased by the unnecessary image erasure unit 19. For this reason, in the image processing apparatus 100 of the present embodiment, only by imaging a predetermined region, an AR scenario including the AR image of the moving object whose distance is measured can be created, resulting in that the user can easily create the AR scenario, and thus a user's convenience is improved.

In the image processing apparatus 100 of the present embodiment, the unnecessary image erasure unit 19 erases a moving object or a still object selected from a captured image as a target which is not generated as an AR image, on the basis of an operation received by the operation unit 34. In other words, the unnecessary image erasure unit 19 selects a target to be generated as an AR image. For this reason, in the image processing apparatus 100 of the present embodiment, since a moving object which is not required to be generated as an AR image or a still object which is required to be generated as an AR image is selected, it is possible to create an AR scenario or a composite scenario which the user can more easily use, and thus a user's usability is improved.

In the image processing apparatus 100 of the present embodiment, the unnecessary image erasure unit 19 erases a still object other than a moving object included in a captured image as a target which is not generated as an AR image, and the AR image extraction unit 21 generates an AR image of a moving object included in the captured image, which is not erased by the unnecessary image erasure unit 19. For this reason, in the image processing apparatus 100 of the present embodiment, even if an operation for selecting a target from which an AR image is to be generated is not performed, the AR image of the moving object is automatically generated. Therefore, for example, in a case where an AR scenario is a moving image for work assistance or the like, and a certain target is required to be moved in this work, an AR image of a moving object which is to be moved is automatically generated, and thus a user's usability is improved.

In the image processing apparatus 100 of the present embodiment, the unnecessary image erasure unit 19 erases a human part extracted by the object recognition unit 13, from a captured image, and the AR image extraction unit 21 does not generate the human part erased from the captured image as an AR image. For this reason, in the image processing apparatus 100 of the present embodiment, in a case where an AR scenario is being executed, since the human hand or the like which is means for moving an object to be moved is not displayed, the user does not visually recognize an unnecessary AR image of the hand or the like, and thus a user's convenience is improved.

In the image processing apparatus 100 of the present embodiment, the AR image extraction unit 21 generates an AR image which targets a moving object in correlation with sound acquired by the microphone 33 while the moving object which is being imaged is moving. For this reason, in the image processing apparatus 100 of the present embodiment, a created AR scenario includes not only visual information such as an AR image which is generated on the basis of a captured image but also an AR image which is also correlated with audible information such as sound, and thus a user's convenience is improved.

In the image processing apparatus 100 of the present embodiment, since sound acquired by the microphone 33 is correlated with a moving object as a text image and thus an AR image is generated, the sound can be generated as visual information in parallel to the AR image. Therefore, the user can easily recognize the information, and a user's convenience is further improved.

In the image processing apparatus 100 of the present embodiment, the AR image extraction unit 21 colors a generated AR image by using RGB data regarding an imaging region, acquired by the RGB camera 31. For this reason, in the image processing apparatus 100 of the present embodiment, since the generated AR image is more similar to a target included in a captured image than an AR image which is not colored, the user can more easily recognize the AR image, and a user's convenience is further improved.

In the image processing apparatus 100 of the present embodiment, during editing of a composite scenario, such as setting of a trigger for causing division into a division scenario, the AR image extraction unit 21 inserts the editing image KC indicating the editing state into an AR scenario. For this reason, in the image processing apparatus 100 of the present embodiment, in a case where an AR scenario is being edited, an image for causing the user to recognize the editing state as visual information is inserted into the AR scenario which is being edited, and thus a user's usability is improved.

In the image processing apparatus 100 of the present embodiment, since a three-dimensional model is favorably generated as an AR image when viewed from any direction of 360 degrees, in a case where an AR scenario is executed, the user can recognize the three-dimensional model from any direction, and thus a user's convenience is improved.

B. Second Embodiment

FIG. 17 is a functional block diagram illustrating a configuration of an image processing apparatus 100*a* according to a second embodiment. The second embodiment is different from the first embodiment in that RGBD data transmitted from a sensor control unit 15*a* is output as streaming data, and a 3D model generation unit 14*a*, an object recognition unit 13*a*, and an object tracking unit 12*a* generate a three-dimensional model of all targets included in an imaging region and transmit the generated three-dimensional models to an AR scenario control unit 11*a* as streaming data.

FIG. 18 is a flowchart illustrating a part of an AR scenario creation process in the second embodiment. In the AR scenario creation process of the second embodiment, since a desired three-dimensional model is output as streaming data while the sensor control unit 15*a* images external scenery and outputs RGBD data for each pixel as streaming data, a process in step S24*a* of FIG. 18 is different from the process in step S24 of the AR scenario creation process (FIG. 3) of the first embodiment. For this reason, in the second embodiment, step S24*a* of FIG. 18 will be described, and description of remaining processes will be omitted. In the process in step S24*a* of FIG. 18, the 3D model generation unit 14*a* generates a three-dimensional model (hereinafter, simply referred to as an "whole three-dimensional model") including all real objects present in an imaging region and targets in a real environment on the basis of streaming data of RGBD data for each pixel, transmitted from the sensor control unit 15*a*. In the present embodiment, specifically, the 3D model generation unit 14*a* generates respective three-dimensional models from respective viewpoints of the cameras 331, 332 and 333, and merges the models into a single three-dimensional model so as to obtain a whole three-dimensional model which is not dependent on the viewpoints from the cameras 331, 332 and 333. In the present embodiment, the whole three-dimensional model is represented by data regarding a polygon mesh (for example, a rendered texture triangle mesh). The 3D model generation unit 14a outputs the data regarding the whole three-dimensional model as streaming data. Hereinafter, outputting as streaming data is simply referred to as stream-outputting.

Next, the object recognition unit 13a discriminates and recognizes three-dimensional models (hereinafter, also simply referred to as element three-dimensional models) which are individual elements included in the whole three-dimensional model from each other on the basis of streaming data of RGB data of the RGBD data for each pixel transmitted from the sensor control unit 15a. In the second embodiment, as a method of discriminating the three-dimensional models from each other, for example, the object recognition unit 13a discriminates a real object through edge detection or the like in RGB data, and correlates a region which is occupied by the discriminated real object in an image space represented by the RGB data, with a region in a space of the whole three-dimensional model. Thus, a portion (element three-dimensional model) included in the region of the whole three-dimensional model is discriminated from other portions. The object recognition unit 13a modifies the element three-dimensional model included in the whole three-dimensional model according to a discrimination result of the three-dimensional models.

The object tracking unit 12a performs an image process on the streaming data of the RGB data transmitted from the sensor control unit 15a so as to specify a real object (moving object) which is moving and a real object which is stopping. The object tracking unit 12a tracks the specified moving object in an image space represented by the RGB data.

The AR scenario control unit 11a stream-outputs an element three-dimensional model corresponding to the moving object tracked by the object tracking unit 12a among the element three-dimensional models in the whole three-dimensional model specified by the object recognition unit 13a. The element three-dimensional model which is stream-output by the object tracking unit 12 includes not only movement of the three-dimensional model but also a change (for example, rotation) in an attitude (pose) including a direction (orientation). The stream-output element three-dimensional model is represented by polygon mesh data in the present embodiment.

In a case where an unnecessary portion is included in the element three-dimensional model which is stream-output by the AR scenario control unit 11a, the AR image extraction unit 21 erases the unnecessary portion from the element three-dimensional model. An unnecessary portion which is determined by the AR image extraction unit 21 may be one element three-dimensional model of a plurality of element three-dimensional models, or a part of an element three-dimensional model, for example, a part of an element three-dimensional model indicating a part (for example, the hand) of the human body covering a target real object. The AR image extraction unit 21 stream-outputs an element three-dimensional model which remains by erasing the unnecessary portion from the element three-dimensional model.

The data storage unit 50 records the element three-dimensional model which is stream-output by the AR image extraction unit 21 as an extracted three-dimensional model. Then, the AR scenario control unit 11a creates an AR scenario by using the extracted three-dimensional model which has been recorded. An AR image included in the AR scenario may be an image showing the extracted three-dimensional model, and may be an image obtained by modifying an exterior of the extracted three-dimensional model. The extracted three-dimensional model may be a three-dimensional model (for example, the three-dimensional model of scale remover TL as illustrated in FIG. 5) which is imaged at the time of the start of imaging in the AR scenario creation process, or may be replaced with other three-dimensional models by using CAD data or the like. In this case, an AR image is implemented in which there is no lack of portion which is hidden by, for example, the hand even after the unnecessary portion is erased from the element three-dimensional model. The AR image of the present embodiment is represented by stream data (for example, stream data of a polygon mesh) of the three-dimensional model. For this reason, it is possible to arbitrarily change a viewpoint with respect to the AR image, and to change the direction of the displayed AR image at any time point in a period of time defined between a start point and an end point of the stream data. A viewpoint from any one of the cameras 331 to 333 may be included in an AR scenario as default viewpoint information by the AR scenario control unit 11a.

The created AR scenario may include an AR image having consecutive movement which is imaged while a stream-output moving object is actually moving. The duration in which the AR image consecutively moves may be the same as or different from time for which an imaged moving object serving as a basis of the AR image actually moves. The AR scenario may be constituted not of a consecutively moving AR image but of a discretely moving AR image. As the discretely moving AR image, for example, in an AR scenario, a state of at least one time point between a state at a time point at which an imaged moving object starts to move and a state at a time point at which the moving object stops moving may be generated as an AR image, and AR images corresponding to a time point at which a moving object starts to move, a time point at which the moving object stops moving, and one time point between the start time point and the stop time point are generated.

C. Third Embodiment

FIG. 19 is a functional block diagram illustrating a configuration of an image processing apparatus 100b according to a third embodiment. FIG. 20 is a flowchart illustrating a part of an AR scenario creation process in the third embodiment. The third embodiment is the same as the second embodiment except that the CPU 10a of the image processing apparatus 100a does not include the object recognition unit 13a. As illustrated in FIG. 19, in the third embodiment, the object recognition unit 13a is omitted, and thus a process in step S24b of the AR scenario creation process is different from the process in step S24a of the AR scenario creation process (FIG. 18) of the second embodiment. In the third embodiment, only differences from the second embodiment will be described, and description of the same content as that in the second embodiment will be omitted.

In the process in step S24b of FIG. 19, the object tracking unit 12b receives the whole three-dimensional model which is stream-output by the 3D model generation unit 14b. The object tracking unit 12b specifies (discriminates) a three-dimensional model (element three-dimensional model) which is moving and a three-dimensional model which is not moving in the whole three-dimensional model. The object tracking unit 12b stream-outputs the specified (discriminated) element three-dimensional model.

D. Fourth Embodiment

A fourth embodiment is mainly different from the first embodiment and the second embodiment in that a plurality of AR scenarios in which an AR image of a moving object is combined with an AR image of an associated still object which is determined as being associated with the moving object and rests are automatically created on the basis of obtained imaging data. In the fourth embodiment, the AR scenario control unit 11a sets each of a moving object and an associated still object as a trigger target for executing an AR scenario. The AR scenario control unit 11a creates each AR scenario for the cases of the following (1) to (4) as predetermined combinations of a moving object and an associated still object as trigger targets detected when the AR scenario is executed.

(1) In a case where only a moving object as a trigger target is detected (2) In a case where only an associated still object as a trigger target is detected (3) In a case where both a moving object and an associated still object as trigger targets are detected (4) In a case where neither a moving object nor an associated still object as trigger targets are detected In the fourth embodiment, an AR scenario corresponding to detection of each of the above conditions (1) to (4) is created, but, in other embodiments, an AR scenario corresponding to three or less cases among the four cases of (1) to (4) may be created.

FIGS. 21 and 22 are flowcharts illustrating an AR scenario creation process in the fourth embodiment. The AR scenario creation process of the fourth embodiment is different from the AR scenario creation process of the second embodiment in terms of the following two facts. One is that an AR scenario can be created on the basis of imaging data which is already obtained, and the other is that a plurality of AR scenarios are automatically created for the cases of (1) to (4). Other processes in the fourth embodiment are the same as those in the AR scenario creation process of the second embodiment. For this reason, in the AR scenario creation process of the fourth embodiment, description of processes in steps S14 to S22 which are the same as those in the second embodiment and the third embodiment will be omitted.

In the AR scenario creation process of the fourth embodiment, first, the microphone 33 or the operation unit 34 receives a predetermined operation for starting creation of an AR scenario (step S81). If the operation for starting creation of an AR scenario is received (YES in step S81), the microphone 33 or the operation unit 34 receives a predetermined operation regarding whether or not an AR scenario to be created is created on the basis of imaging data (step S83). If a predetermined operation indicating that an AR scenario is not created on the basis of imaging data is received (NO in step S83), the AR scenario control unit 11a performs the processes in steps S14 to S22 in the same manner as in the second embodiment. If a predetermined operation indicating that an AR scenario is created on the basis of imaging data is received in the process in step S83 (YES in step S83), the 3D model generation unit 14a generates a whole three-dimensional model in the same manner as in the second embodiment (step S24a of FIG. 22). Specifically, the 3D model generation unit 14a generates the whole three-dimensional model on the basis of streaming data of RGBD data for each pixel transmitted from the sensor control unit 15a.

FIGS. 23 to 27 illustrate a case where external scenery SC including a plurality of subjects is imaged by the RGB camera 31 and the distance sensor 32 in the fourth embodiment. FIG. 23 illustrates the external scenery SC including a casing BX, a cover CV, a screwdriver DV as a tool, and four bolts BT. FIGS. 23 to 26 illustrate a change in which the casing BX and the cover CV as separate components are assembled as an integrated component by using the screwdriver DV and the bolts BT. Four female screw portions Bh to which male screw portions of the bolts BT are fitted are formed in the casing BX. In order to fix the cover CV to the casing BX, round holes Ch are formed at positions corresponding to the female screw portions Bh of the casing BX in the cover CV when the casing BX is combined with the cover CV.

FIG. 24 illustrates the external scenery SC in which the left hand LH of a worker holds the cover CV at a position where the cover is fixed to the casing BX which is not moving, when compared with the external scenery SC illustrated in FIG. 23. In the state illustrated in FIG. 24, the casing BX and the cover CV are not fixed to each other via the bolts BT, and the position of the cover CV is temporarily fixed by the left hand LH. In the state in which the external scenery SC illustrated in FIG. 23 changes to the external scenery SC illustrated in FIG. 24, the cover CV is moving and is thus a moving object. The casing BX is a still object which contacts the cover CV as a moving object and is thus an associated still object.

FIG. 25 illustrates the external scenery SC in which the right hand RH of the worker holds the screwdriver DV, and a single bolt BT is attached to a tip of the screwdriver DV, when compared with the external scenery SC illustrated in FIG. 24. In FIG. 25, the positions of the casing BX, the cover CV, and the left hand LH do no change. In the state in which the external scenery SC illustrated in FIG. 24 changes to the external scenery SC illustrated in FIG. 25, the screwdriver DV and the bolt BT attached to the tip of the screwdriver DV are moving objects. The screwdriver DV and the bolt BT are regarded as a single moving object when integrally moving. The three bolts BT which are not attached to the screwdriver DV are still objects which are not associated with a moving object. Although not illustrated, in a state in which the screwdriver DV and the bolt BT are not integrated, the screwdriver DV or the bolts BT is a moving object, and the other is an associated still object.

FIG. 26 illustrates the external scenery SC in which the single bolt BT attached to the tip of the screwdriver DV held by the right hand RH is inserted into one female screw portion Bh of the casing BX and is rotated, when compared with the external scenery SC illustrated in FIG. 25. In the state in which the external scenery SC illustrated in FIG. 25 changes to the external scenery SC illustrated in FIG. 26, the casing BX and the cover CV do not move. Therefore, the screwdriver DV and the bolt BT are moving objects, and the casing BX and the cover CV are associated still objects.

FIG. 27 illustrates the external scenery SC in which the single bolt BT is fitted to one female screw portion Bh of the casing BX so that the casing BX and the cover CV are fixed to each other, and the tip of the screwdriver DV is separated from the bolt BT, when compared with the external scenery SC illustrated in FIG. 26. In the state in which the external scenery SC illustrated in FIG. 26 changes to the external scenery SC illustrated in FIG. 27, the screwdriver DV is a moving object, and the casing BX, the cover CV, and the bolts BT are associated still objects. In other embodiments, the screwdriver DV is a moving object, and the casing BX, the cover CV, and the bolts BT have no relation to the screwdriver DV, and may thus be treated as not being associated still objects.

In step S24a of FIG. 22, respective 3D models of all the targets including the moving objects and the associated still objects are created on the basis of the captured images of the changes in the external scenery SC illustrated in FIGS. 23 to 27. Then, the AR scenario control unit 11a selects a single moving object from one or more moving objects specified by the object tracking unit 12a in a generated whole three-dimensional model (step S85). Among the changes in the external scenery SC from FIG. 23 to FIG. 27, the AR scenario control unit 11a selects the cover CV as a moving object, for example, in the change in the external scenery SC from FIG. 23 to FIG. 24.

The AR image extraction unit 21 generates a cover image IMC which will be described later as an AR image of the cover CV as the selected moving object (step S87). Thereafter, the AR scenario control unit 11a determines whether or not there is an associated still object which is specified as being in contact with the cover CV as the selected moving object on the basis of a distance measured by the object recognition unit 13a (step S89). The AR scenario control unit 11a specifies a still object which is present within a predetermined distance from the moving object, as an associated still object being in contact with the moving object. In the change in the external scenery SC from FIG. 23 to FIG. 24, the AR scenario control unit 11a specifies the casing BX as an associated still object of the cover CV as the moving object. Thus, it is determined that there is an associated still object of the cover CV (YES in step S89), and the AR image extraction unit 21 generates an AR image of all associated still objects (step S91). The AR image extraction unit 21 generates a casing image IMX which will be described later as an AR image of the casing BX which is the associated still object.

Next, the unnecessary image erasure unit 19 erases moving objects and still objects other than the selected moving object and the associated still object, as unnecessary objects (step S93). In the change in the external scenery SC from FIG. 23 to FIG. 24, the unnecessary image erasure unit 19 erases the cover CV, the bolts BT, and the left hand LH as unnecessary objects. Next, the AR scenario control unit 11a sets each of the cover CV which is the moving object generated as an AR image and the casing BX which is the associated still object generated as an AR image, as a trigger target for executing an AR scenario. The AR scenario control unit 11a creates AR scenarios corresponding to combinations of the presence or absence of the moving object and the presence or absence of the associated still object as the set trigger targets (step S95). Details of AR scenarios created so as to correspond to combinations of the trigger targets will be described later.

If the respective AR scenarios corresponding to the predetermined combinations are created, the AR scenario control unit 11a determines whether or not all moving objects included in the imaging data are selected and an AR scenario is created (step S97). Since only the cover CV is selected as a moving object, and all moving objects are not selected (NO in step S97), the AR scenario control unit 11a performs the processes in step S85 and the subsequent steps. If it is determined in the process in step S97 that all moving objects other than the cover CV are selected in the imaging data (YES in step S97), the AR scenario control unit 11a preserves all created AR scenarios in the data storage unit 50 and finishes the AR scenario creation process.

FIG. 28 is a list illustrating examples of combinations of the trigger targets and the combinations of the AR scenarios, created in the process in step S95 of the AR scenario creation process in the fourth embodiment. FIG. 28 illustrates display images which are displayed so as to correspond to predetermined combinations (1) to (4) of detected trigger targets when a created AR scenario is executed. FIG. 28 illustrates the display images corresponding to the combinations (1) to (4) in a case where a moving object is the cover CV, and an associated still object is the casing BX. Hereinafter, a display image which is displayed so as to correspond to a detected trigger target in a case where an AR scenario is executed will be explained.

In the fourth embodiment, a description is made of a case where an example of a moving object is the cover CV, and an example of an associated still object is the casing BX, but a relationship between the combinations and the display images illustrated in FIG. 28 is stored as data or a program, and is thus applicable to objects other than the cover CV or the casing BX. Therefore, even for an moving object or an associated still object which is different from that in the fourth embodiment, images corresponding to the combinations are created as in the following (1) to (4), and the created images are displayed when an AR scenario is executed.

(1) If a combination includes only a moving object as a trigger target, an image of an associated still object is displayed as a display image.

(2) If a combination includes only an associated still object as a trigger target, an image of a moving object integrated with (or overlaid on) the detected associated still object is displayed.

(3) If a combination includes a moving object and an associated still object as trigger targets, an image of the moving object integrated with (or overlaid on) the detected associated still object is displayed.

(4) If a combination does not include any trigger target (in a case of non-detection), an image in which a moving object and an associated still object are integrated with each other is displayed.

FIG. 29 is a flowchart illustrating a display image determination process in a case where an AR scenario is being executed. The display image determination process is a process in which the HMD 200 as an apparatus which is executing an AR scenario determines a display image to be displayed on the optical image display units 86 and 88 according to a combination of detected trigger targets in a case where the AR scenario is being executed.

In the display image determination process, first, the camera 89 of the HMD 200 images external scenery (step S101). The CPU 75 of the HMD 200 determines whether or not the trigger target of the combination (1) illustrated in FIG. 28 is detected in an image captured by the camera 89 (step S103). If it is determined that the trigger target of the combination (1) is detected (YES in step S103), the CPU 75 determines the display image correlated with the combination (1) as an image to be displayed on the optical image display units 86 and 88 (step S111). Then, the CPU 75 finishes the display image determination process.

FIG. 30 is a diagram illustrating an example of a visual field VR recognized by the user when a display image correlated with the combination (1) is displayed on the optical image display units 86 and 88. FIG. 30 illustrates an example of the visual field VR recognized by the user wearing the image display section 80 of the HMD 200 on the head in a case where the cover CV which is a moving object as the trigger target is detected. As illustrated in FIG. 30, the user visually recognizes not only the cover CV, the screwdriver DV, and the bolts BT as real objects included in the external scenery SC but also the casing image IMX displayed as an image. In other words, as in the combination (1) illustrated in FIG. 28, in a case where an AR scenario is executed, and only the cover CV which is a moving object as a trigger target is detected, the AR scenario control unit 11*a* creates an AR scenario in which only the casing image IMX of an associated still object is set as a display image. In FIG. 30, the screwdriver DV and the plurality of bolts BT as real objects are detected, but, in the combinations illustrated in FIG. 28, the screwdriver DV and the bolts BT as real objects have no relation to the presence or absence of a display image. Also in FIGS. 31 to 33 to be described later, the screwdriver DV and the bolts BT as real objects have no relation to the presence or absence of a display image.

If it is determined in the process in step S103 of FIG. 29 that the trigger target of the combination (1) is not detected (NO in step S103), the CPU 75 determines whether or not the trigger target of the combination (2) illustrated in FIG. 28 is detected (step S105). If it is determined that the trigger target of the combination (2) is detected (YES in step S105), the CPU 75 displays the display image correlated with the combination (2) as an image to be displayed on the optical image display units 86 and 88 (step S113). Then, the CPU 75 finishes the display image determination process.

FIG. 31 is a diagram illustrating an example of a visual field VR recognized by the user when a display image correlated with the combination (2) is displayed on the optical image display units 86 and 88. FIG. 31 illustrates an example of the visual field VR recognized by the user of the HMD 200 in a case where the casing BX which is an associated still object as the trigger target is detected. As illustrated in FIG. 31, in a case where an AR scenario is executed, and only the casing BX which is an associated still object as the trigger target is detected, the CPU 75 displays the image shown in the combination (2) illustrated in FIG. 28 on the optical image display units 86 and 88. The CPU 75 displays, as a display image, the cover image IMC of the cover CV which is a moving object at a position where the cover is stopped last in imaging data when an AR scenario is created, that is, at a position where the cover CV is attached to the casing BX. In other words, the AR scenario control unit 11*a* creates an AR scenario in which the cover image IMC which is an AR image of the cover CV is displayed at a position where the cover is integrated with the casing BX which is an associated still object.

If it is determined in the process in step S105 of FIG. 29 that the trigger target of the combination (2) is not detected (NO in step S105), the CPU 75 determines whether or not the trigger targets of the combination (3) illustrated in FIG. 28 are detected (step S107). If it is determined that the trigger targets of the combination (3) are detected (YES in step S107), the CPU 75 determines the display image correlated with the combination (3) as an image to be displayed on the optical image display units 86 and 88 (step S115). Then, the CPU 75 finishes the display image determination process.

FIG. 32 is a diagram illustrating an example of a visual field VR recognized by the user when a display image correlated with the combination (3) is displayed on the optical image display units 86 and 88. FIG. 32 illustrates an example of the visual field VR recognized by the user of the HMD 200 in a case where the cover CV which is a moving object as the trigger target and the casing BX which is an associated still object as the trigger target are detected. As illustrated in FIG. 32, in a case where an AR scenario is executed, and the casing BX and the cover CV as the trigger targets are detected, the CPU 75 displays the image shown in the combination (3) illustrated in FIG. 28 on the optical image display units 86 and 88. The CPU 75 displays, as a display image, the cover image IMC of the cover CV at a position where the cover CV is integrated with the casing BX which is an associated still object on the optical image display units 86 and 88 in the same manner as in the cover image IMC illustrated in FIG. 31. In other words, the AR scenario control unit 11*a* creates an AR scenario in which the cover image IMC which is an AR image of the cover CV is displayed at a position where the cover is integrated with the casing BX which is an associated still object.

If it is determined in the process in step S107 of FIG. 29 that the trigger target of the combination (3) is not detected (NO in step S107), the CPU 75 determines whether or not the trigger targets of the combination (4) illustrated in FIG. 28 are detected (step S109). If it is determined that the trigger targets of the combination (4) are detected (YES in step S109), the CPU 75 determines the display image correlated with the combination (4) as an image to be displayed on the optical image display units 86 and 88 (step S117). Then, the CPU 75 finishes the display image determination process.

FIG. 33 is a diagram illustrating an example of a visual field VR recognized by the user when a display image correlated with the combination (4) is displayed on the optical image display units 86 and 88. FIG. 33 illustrates an example of the visual field VR recognized by the user of the HMD 200 in a case where the cover CV which is a moving object as the trigger target and the casing BX which is an associated still object as the trigger target are not detected. As illustrated in FIG. 33, in a case where an AR scenario is executed, and neither of the trigger targets is detected, the CPU 75 displays the image shown in the combination (4) illustrated in FIG. 28 on the optical image display units 86 and 88. The CPU 75 displays, as a display image, the cover image IMC and the casing image IMX indicating a state in which the cover CV which is a moving object and the casing BX which is an associated still object are integrated with each other, on the optical image display units 86 and 88. In other words, the AR scenario control unit 11*a* creates an AR scenario in which the casing image IMX and the cover image IMC are displayed as AR images in which the casing BX and the cover CV are integrated with each other in a case where neither of the trigger targets is detected.

If it is determined in the process in step S109 of FIG. 29 that the trigger targets of the combination (4) are not detected (NO in step S109), the CPU 75 does not display either of AR images on the optical image display units 86 and 88 and finishes the display image determination process. In other embodiments, a display related process using a different moving object and associated still object as trigger targets may be performed following the display related process of the fourth embodiment. As mentioned above, the AR scenario control unit 11*a* of the fourth embodiment automatically creates AR scenarios including AR images which respectively correspond to the combinations of the trigger targets as illustrated in FIG. 28. The cover CV which is a moving object corresponds to a moving target in the appended claims, and the casing BX which is an associated still object corresponds to an associated still target in the appended claims. The cover image IMC of the cover CV corresponds to a moving target correlated image in the appended claims, and the casing image IMX of the casing BX which is an associated still object corresponds to an associated still target image in the appended claims.

As described above, in the image processing apparatus 100a of the fourth embodiment, the AR scenario control unit 11a sets the cover CV and the casing BX as trigger targets for executing an AR scenario. Therefore, in the image processing apparatus 100a of the fourth embodiment, since the AR scenario is created so as to be executed by detecting a specific condition which is set in advance, it is possible to set an execution timing in accordance with usage of the AR scenario.

In the image processing apparatus 100a of the fourth embodiment, the AR scenario control unit 11a creates an AR scenario including display and non-display of AR images, that is, the cover image IMC and the casing image IMX, corresponding to the presence or absence of the cover CV which is a moving object and the casing BX which is an associated still object, detected when an AR scenario is executed. Therefore, in the image processing apparatus 100a of the fourth embodiment, a plurality of AR scenarios including an AR image associated with a moving object are created on the basis of imaging data even if a certain particular operation is not performed, and thus usability of the image processing apparatus 100a is improved.

E. Modification Examples

The invention is not limited to the above-described embodiments, and may be implemented in various aspects within the scope without departing from the spirit thereof. For example, the following modification examples may also occur.

E-1. Modification Example 1

In the first embodiment, a description has been made of a composite scenario constituted of a basic scenario for prompting removal of scales of the fish FS and a division scenario into which division occurs from the basic scenario when the kitchen knife KN is detected, but a composite scenario is not limited thereto and may be variously modified. For example, a composite scenario is not required to be constituted of two AR scenarios, and may be a single AR scenario, or may be a composite scenario in which three or more AR scenarios are composed. A composite scenario may be created by using a plurality of AR scenarios which are treated in parallel without differentiating AR scenarios into upper and lower AR scenarios unlike a basic scenario and a division scenario.

In the embodiments, an AR image or the like is generated on the basis of data acquired by the RGB camera 31 or the microphone 33, but such a device is not an essential constituent element and may be variously modified. For example, the image processing apparatus 100 is not required to include the RGB camera 31, the microphone 33, the operation unit 34, and the display unit 35, and may create an AR scenario by creating only an automatically captured AR image of a moving object in an imaging region. The CPU 10 is not required to include the additional information acquisition unit 18, and may create an AR scenario on the basis of only imaging data regarding a captured image.

In the first embodiment, the AR scenario operation setting unit 17 displays an image such as the editing image KC when setting a trigger for causing division to occur from a basic scenario into a division scenario in a case where a composite scenario constituted of the basic scenario and the division scenario is created, but is not necessarily required to display such an image. During editing, instead of displaying the editing image KC, the AR scenario operation setting unit 17 may cause a user to recognize that a trigger is set by changing a color of an AR image or the like. Instead of displaying the editing image KC, the AR scenario operation setting unit 17 may cause a user to recognize that a trigger is set by outputting sound. In this modification example, since a user can recognize an editing state or the like in sound, the editing image KC does not overlap an AR image when compared with a case where an image such as the editing image KC is displayed, and thus a user's usability during editing or the like is further improved.

In the embodiments, three cameras 311, 312 and 313, and three distance sensors 321, 322 and 323 perform imaging, but a single camera may perform imaging, and a single camera and a single distance sensor may perform imaging. For example, the external scenery SC may be imaged by the single camera 311 and the single distance sensor 321 mounted in the HMD, a wearer of the HMD may be a subject OB (performer), and an AR scenario may be created by tracking an action of the subject OB or work. In this case, even if an imaging region is changed due to a movement of the head of the subject OB, a correspondence relationship between a real space and a space of a three-dimensional model can be corrected by the nine-axis sensor 87 or the like mounted in the HMD. It is possible to easily create an AR scenario including an AR image of a two-dimensional model or a three-dimensional model even if a single camera is used. In this case, the image processing apparatus 100 which generates an AR image or an AR scenario may be implemented by a processor and a storage device on the HMD, and may be implemented by a processor and a storage device included in an external computer which can perform bidirectional communication with the HMD via a network (for example, a wireless LAN).

In this case, as methods of preventing a shield portion from being generated in an AR image due to being hidden by the hand or the like, in addition to the above-described method, there is the following method. For example, during creation of an AR scenario, a visual or audible message such as the content that "show the object you have in different angles or directions" may be presented to a performer wearing the HMD, and, in a case where images of the object in different angles or directions are acquired by the camera 311 and the distance sensor 321, the images in the different angles or directions may be combined with each other so that a single three-dimensional model is generated.

In the embodiments, the unnecessary image erasure unit 19 erases an unnecessary object so that the unnecessary object is not generated as an AR image, but treatment of an unnecessary object may be variously modified. For example, an unnecessary object may be generated as an AR image like a moving object, and may be generated as a translucent AR image or a two-dimensional image by changing RGB data. In this modification example, for example, in a case where a user executing a created AR scenario does not know how to hold the scale remover TL, an image of a portion of the hand of the subject OB is displayed in correlation with an AR image of the scale remover TL, and thus a user's convenience is improved.

E-2. Modification Example 2

The CPU 10 may include an automatic learning unit. The automatic learning unit learns an attitude (pose) or a position of an image of an object included in a captured image, and can thus recognize a moving object or an amorphous object whose specification is not defined. The automatic learning unit automatically selects the optimum combination of a shape, a color, and a pattern according to a plurality of recognition algorithms, and can thus implement learning type recognition with high adaptability to an environmental change (for example, a change in a process or a change in illumination).

In the embodiments, an AR image generation target is correlated with a correlated object which is detected within a predetermined range from the target in terms of a positional relationship, but an AR image with which a correlated object located close to the AR image generation target is correlated in terms of a positional relationship is not necessarily required to be generated. For example, regardless of a position of a correlated object detected from a captured image, if the correlated object is detected, an AR image may be displayed at a preset position. A positional relationship between a correlated object and an AR image may be set as appropriate on the basis of an operation received by the operation unit 34.

In the embodiments, the unnecessary image erasure unit 19 generates an AR image in correlation with a position of a detected correlated object, but is not necessarily required to generate an AR image in correlation with a position of a detected correlated object. For example, an AR image may be correlated with a user's voice acquired by the microphone 33.

In the first and second embodiments, the embodiments have been described by exemplifying cooking work as an action or work performed by the subject OB. However, another aspect of the invention is applicable to attachment of a mechanical component in a factory, inspection of a machine, and an embodiment of creating an AR image displayed during work which is performed on a mechanical real object. Still another aspect of the invention is also applicable to an embodiment of creating an AR image displayed during work (leisure or game) using toys, such as a method of assembling LEGO (registered trademark) blocks made by LEGO Group.

E-3. Modification Example 3

As mentioned above, in the image processing apparatus 100a of the fourth embodiment, the AR scenario control unit 11a automatically creates AR scenarios which respectively correspond to combinations of trigger targets detected when an AR scenario is executed. In addition thereto, the AR scenario control unit 11a may add additional information such as sound acquired by the additional information acquisition unit 18 to created AR scenarios by receiving a predetermined operation as in the first embodiment.

In the image processing apparatus 100a of the fourth embodiment, the AR scenario control unit 11a creates AR scenarios corresponding to all combinations of the presence or absence of a moving object and the presence or absence of an associated still object, but may create only AR scenarios corresponding to some of the combinations. In the process in step S97 of FIG. 22, the AR scenario control unit 11a creates AR scenarios corresponding to combinations of all selected moving objects in the imaging data, but may create only AR scenarios corresponding to some of the selected moving objects.

In the display image determination process of the fourth embodiment illustrated in FIG. 29, a display image is determined through determination of matching with the trigger target of the combinations illustrated in FIG. 28, but a display image may be determined through determination of whether or not each trigger target is detected. For example, in a case where there are four components, that is, the cover CV, the casing BX, the screwdriver DV, and the bolt BT as all trigger targets included in an AR scenario, the flowchart may branch out depending on whether or not each component is detected, and then a display image may be determined. Specifically, first, it is determined whether or not the cover CV is detected, next, it is determined whether or not the casing BX is detected, next, it is determined whether or not the screwdriver DV is detected, then it is determined whether or not the bolt BT is detected, and a display image may be determined on the basis of all determination results. In the display image determination process of this modification example, even in a case where a plurality of trigger targets are set in an AR scenario, an AR image included in a corresponding AR scenario can be displayed.

The invention is not limited to the above-described embodiments or modification examples, and may be implemented using various configurations within the scope without departing from the spirit thereof. For example, the embodiments corresponding to technical features of the respective aspects described in Summary of Invention and the technical features in the modification examples may be exchanged or combined as appropriate in order to solve some or all of the above-described problems, or in order to achieve some or all of the above-described effects. In addition, if the technical feature is not described as an essential feature in the present specification, the technical feature may be deleted as appropriate.

REFERENCE SIGNS LIST

10: CPU
11: AR scenario control unit
12: Object tracking unit (object selection unit)
13: Object recognition unit
14: 3D model generation unit
15: Sensor control unit
16: UI control unit
17: AR scenario operation setting unit
18: Additional information acquisition unit
19: Unnecessary image erasure unit
20: Image display unit
21: AR image extraction unit (image generation unit)
31: RGB camera (imaging unit)
32: Distance sensor (distance measurement unit)
33: Microphone (operation reception unit, sound acquisition unit)
34: Operation unit (operation reception unit)
35: Display unit
50: Data storage unit
60: Power supply
70: Control section
75: CPU
80: Image display section
81: Right earphone
82: Right display driving unit
83: Left earphone
84: Left display driving unit
85: Connection unit
86: Right optical image display unit
87: Nine-axis sensor
88: Left optical image display unit
89: Camera
91: Depth sensor
100: Image processing apparatus
161: Text conversion portion
200: HMD 311: First camera (imaging unit)
312: Second camera (imaging unit)
313: Third camera (imaging unit)
321: First distance sensor (distance measurement unit)
322: Second distance sensor (distance measurement unit)
323: Third distance sensor (distance measurement unit)
OB: Subject
SC: External scenery
KC: Editing image (specific image)
TL: Scale remover
KN: Kitchen knife
VR: Visual field
FS: Fish
AR1, AR2: Image
TX1, TX2: Text image
CV: Cover (moving target)
BX: Casing (associated still target)
DV: Screwdriver
BT: Bolt
Bh: female screw portion of casing
Ch: Hole of cover
LH: Left hand
RH: Right hand
IMX: Casing image (associated still target image)
IMC: Cover image (moving target correlated image)

The invention claimed is:

1. An image processing apparatus comprising:
a storage device; and
a processor programmed to execute a process comprising:
  obtaining RGB data and depth data of external scenery, the RGB data and the depth data being acquired by a camera and a depth sensor, respectively;
  identifying, based on at least the RGB data, a first object and a second object, the first object being a moving object, and the second object being in contact with the first object in at least one image in the RGB data;
  generating, based on the RGB data and the depth data, first three-dimensional model data corresponding to the first object, and second three-dimensional model data corresponding to the second object,
  wherein the generated first three-dimensional model data and the generated second three-dimensional model data are not dependent on viewpoints of the camera and the depth sensor;
  generating augmented reality scenario data containing the first three-dimensional model data to be used as augmented reality content and the second three-dimensional model data to be used to detect a target object corresponding to the second object, the augmented reality scenario data to be processed by another processor that is coupled with another camera and a display; and
  storing, in the storage device, the augmented reality scenario data.

2. The image processing apparatus according to claim 1, wherein the processor is further programmed to execute the process, the process further comprising:
  receiving an operation; and
  erasing an unnecessary portion so as to generate the first three-dimensional model data based on the received operation.

3. The image processing apparatus according to claim 1, wherein the processor is further programmed to execute the process, the process further comprising:
  generating an image of the first object, so that the augmented reality scenario data further contains the image.

4. The image processing apparatus according to claim 1, wherein the processor is further programmed to execute the process, the process further comprising:
  identifying, based on at least the RGB data, a shape of the human body from the first object; and
  generating the first three-dimensional model data without the shape of the human body.

5. The image processing apparatus according to claim 1, wherein the processor is further programmed to execute the process, the process further comprising:
  acquiring external sound; and
  correlating the first three-dimensional model data with sound acquired while the first object is moving, so that the augmented reality scenario data further contains the sound acquired while the first object is moving.

6. The image processing apparatus according to claim 5, wherein the processor is further programmed to execute the process, the process further comprising:
  generating a text image based on the acquired sound, so that the augmented reality scenario data further contains the text image.

7. The image processing apparatus according to claim 1, wherein the processor is further programmed to execute the process, the process further comprising:
  generating a virtual moving image based on the first three-dimensional model data; and
  inserting a specific image into the virtual moving image at a specific time point of the virtual moving image, so that the augmented reality scenario further contains the virtual moving image and the specific image.

8. The image processing apparatus according to claim 1, wherein the processor is further programmed to execute the process, the process further comprising:
  acquiring external sound;
  generating a virtual moving image based on the first three-dimensional model data; and
  inserting the acquired sound into the virtual moving image at a specific time point of the virtual moving image, so that the augmented reality scenario data further contains the virtual moving image and the acquired sound.

9. A computer-implemented control method for an image processing apparatus, comprising:
  obtaining RGB data and depth data of external scenery, the RGB data and the depth data being acquired by a camera and a depth sensor, respectively;
  identifying, based on at least the RGB data, a first object and a second object, the first object being a moving object, and the second object being in contact with the first object in at least one image in the RGB data;
  generating, based on the RGB data and the depth data, a first three-dimensional model data corresponding to the first object, and second three-dimensional model data corresponding to the second object,
  wherein the generated first three-dimensional model data and the generated second three-dimensional model data are not dependent on viewpoints of the camera and the depth sensor;
  generating augmented reality scenario data containing the first three-dimensional model data to be used as augmented reality content and the second three-dimensional model data to be used to detect a target object corresponding to the second object, the augmented reality scenario data to be processed by another processor that is coupled with another camera and a display; and storing, in a storage device, the augmented reality scenario data.

10. A non-transitory computer-readable medium having a computer program for an image processing apparatus stored thereon, the computer program causing a computer to implement:

obtaining RGB data and depth data of external scenery, the RGB data and the depth data being acquired by a camera and a depth sensor, respectively;

identifying, based on at least the RGB data, a first object and a second object, the first object being a moving object, and the second object being in contact with the first object in at least one image in the RGB data;

generating, based on the RGB data and the depth data, first three-dimensional model data corresponding to the first object, and second three-dimensional model data corresponding to the second object, wherein the generated first three-dimensional model data and the generated second three-dimensional model data are not dependent on viewpoints of the camera and the depth sensor;

generating augmented reality scenario data containing the first three-dimensional model data to be used as augmented reality content and the second three-dimensional model data to be used to detect a target object corresponding to the second object, the augmented reality scenario data to be processed by another processor that is coupled with another camera and a display; and storing, in a storage device, the augmented reality scenario data.

* * * * *